United States Patent [19]
Pilat et al.

[11] 4,450,523
[45] May 22, 1984

[54] APPARATUS FOR DERIVING THE CURRENT LENGTH OF VARYING-LENGTH DATA ITEMS IN A DIGITAL DATA PROCESSING SYSTEM

[75] Inventors: John F. Pilat, Raleigh; Anastasia J. Czerniakiewicz, Durham, both of N.C.; David B. Kinder, Portland, Oreg.; Gary Davidian, Raleigh, N.C.

[73] Assignee: Data General Corporation, Westboro, N.C.

[21] Appl. No.: 302,264

[22] Filed: Sep. 11, 1981
(Under 37 CFR 1.47)

[51] Int. Cl.³ .............................................. G06F 9/34
[52] U.S. Cl. .................................................... 364/200
[58] Field of Search ................................. 364/200, 900

[56] References Cited
U.S. PATENT DOCUMENTS
4,130,867 12/1978 Backman et al. ................. 364/200

Primary Examiner—Thomas M. Heckler
Attorney, Agent, or Firm—Gordon E. Nelson; Joel Wall; Jacob Frank

[57] ABSTRACT

Improved apparatus for specifying and computing the current length of varying-length data items, together with methods for computing the current length. The apparatus and methods are used in a digital computer system wherein data items are represented by names associated with name table entry items in memory. The name table entry associated with the name represented by the varying-length data item includes a current number of elements item specifier specifying the address of a current number of elements item which specifies the number of elements currently in the represented varying-length data item. The name table entry further includes an element size specifier specifying the size of the elements. A name processor in the processor uses the current number of elements item specifier to obtain the the address of the current number of elements item and and fetches the current number of elements item from memory. The name translator then calculates the current length using the element size and the current number of elements item.

17 Claims, 13 Drawing Figures

IMPROVED POINTER FORMATS

NAME FORMATS

NAME TABLE OVERVIEW

*IMPROVED I-STREAM*

CONCEPTUAL DIAGRAM OF CALCULATING
UNIT AND ACCUMLATOR IN THE PRESENT INVENTION

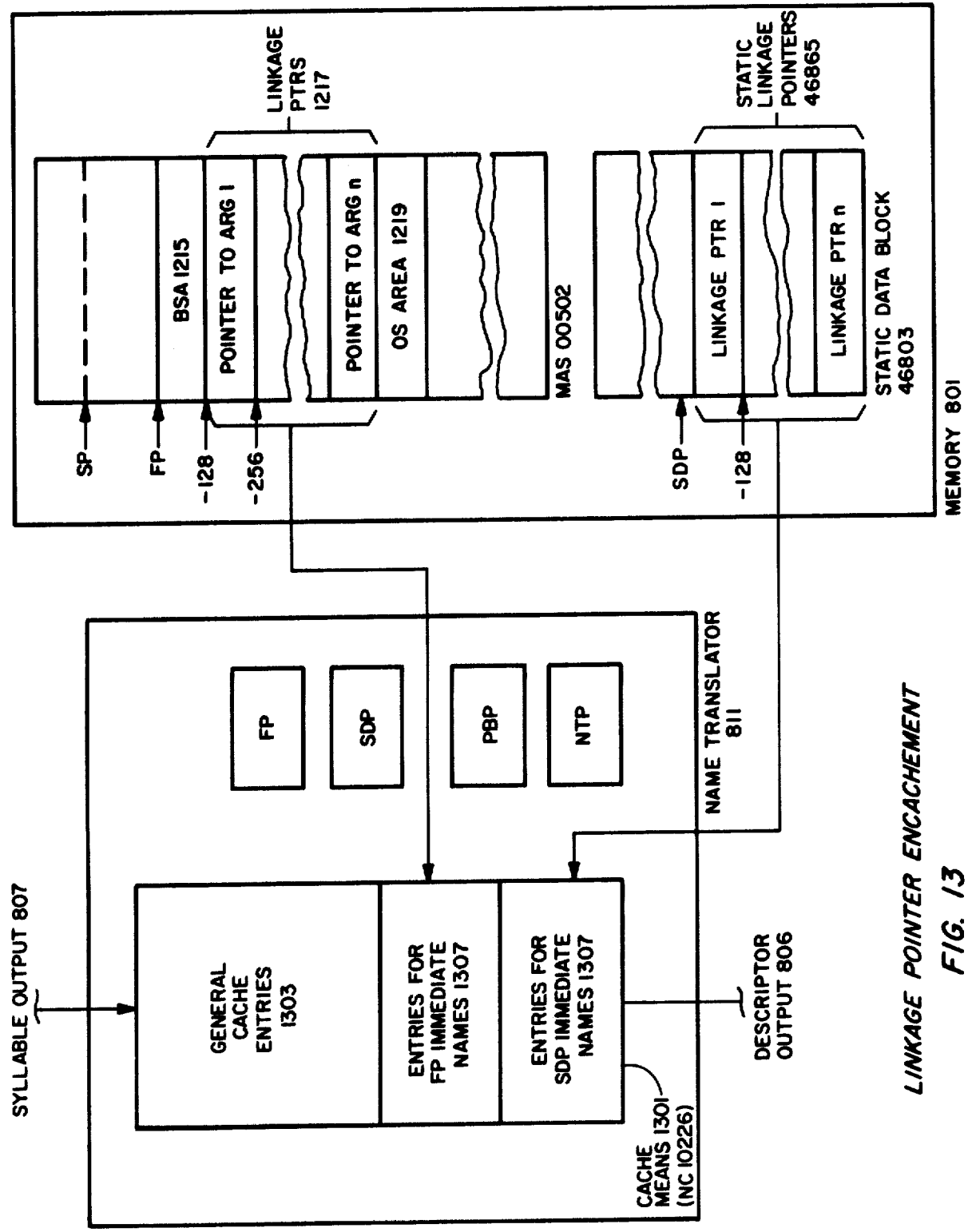

APPARATUS FOR DERIVING THE CURRENT LENGTH OF VARYING-LENGTH DATA ITEMS IN A DIGITAL DATA PROCESSING SYSTEM

CROSS REFERENCE TO RELATED APPLICATIONS

The present patent application is related to U.S. patent application Ser. No. 266,539, filed May 22, 1981, and to U.S. patent application Ser. Nos. 301,997, 301,999, 302,000, 302,261, 302,262, 302,263, 302,264, 302,321, and 302,322, all filed on 9/11/81, and U.S. patent application Ser. No. 303,312, filed 9/15/81.

BACKGROUND OF THE INVENTION

1. Field of the Invention

The present invention relates to digital data processing systems and more particularly to digital data processing systems characterized by one or more of the following features:

An address space segmented into objects, so that an address of data consists of two parts: an object identifier specifying an object and an offset value specifying a location within the object specified by the object identifier.

Pointers, that is, data which represents addresses, which may represent addresses either directly indirectly. Pointers which represent addresses directly contain addresses; those which represent addresses indirectly contain information which the digital data processing system uses to obtain an address.

Multiple S-languages instead of a single instruction set. An S-language is an intermediate language closely related to a high-level programming language. The meaning of a given operation code in a system with multiple S-languages depends solely on the S-language.

Standard operation code sizes and operand syllable sizes for all S-languages.

Instructions contained in procedures in special objects called procedure objects. Execution of a procedure may be commenced only by a Call instruction.

Instructions which specify locations in memory for data, an operation to be performed on the data, and a destination location in memory for the result of the operations, as opposed to instructions which specify transfers between memory and registers and operations on the contents of the registers.

Call and Return instructions which have the same semantics and manipulate the same data structures in all S-languages.

Base-displacement addressing from base pointers whose values may be changed solely by the execution of Call and Return instructions.

Instructions in which operands are represented by names, that is, indexes into data structures called name tables containing name table entries. In order to obtain the operand's location, the name is resolved, i.e., information in the name's name table entry is combined with the values of the base pointers to produce a descriptor specifying the location, length, and type of the operand represented by the name.

Cache means in the central processing unit for encaching information required to resolve a name.

The present invention may be employed with advantage in any digital data processing system having one or more of the listed characteristics and is particularly advantageous in a digital data processing system having several or all of the above characteristics.

2. Description of the Prior Art

The present data processing systems are an improvement over certain previous digital data processing systems, hereafter referred to as the original data processing systems and described more fully in U.S. Pat. No. 266,539, filed May 22, 1981. The present and original systems have the characteristics listed above and have a number of advantages over traditional digital data processing systems.

Considering first the characteristics shared by the original and present systems, the segmentation of the address space into objects permits an address space which is on the one hand very large, and on the other hand divisible into private address spaces. Which users have access to a given set of objects is determined by a component of the digital data processing system called the access control system.

With regard to the pointers, the existence of pointers which represent addresses either directly or indirectly allows the interpretation of a pointer which represents an address indirectly to be delayed until the actual execution of the program using the pointer. Indeed, though the value of the pointer remains unchanged, the address derived from the value may vary in different executions of the program.

With regard to multiple S-languages, the use of different S-languages corresponding to different high-level languages allows the S-language to be tailored to the high-level language, thereby simplifying the task of compilers and reducing the amount of S-language code produced from a given amount of high-level language code. The complexity of S-language code is further reduced by the use of call and return instructions and instructions which specify operations in terms of the location of data in memory and the operations to be performed on the data and by the use of names to represent operands in the instructions. Since the names refer to name table entries containing location, length, and type information, complicated references are possible in spite of the simplicity of the names. The use of standard sizes for operation codes and operand syllables in all of the S-languages, finally, allows the construction of specialized hardware devices for parsing instructions.

The combination of uniform call and return S-instructions with base-displacement addressing from base pointers whose values may be changed only by a call or a return S-instruction, finally, ensures that a program's addressing environment remains constant throughout the execution of a procedure and allows name table entries to specify locations as offsets from the base pointers.

Experience with the original digital data processing systems of the type described above has, however, revealed a number of problems and shortcomings which reduce the speed and efficiency of execution of programs executed on such systems. These problems and shortcomings involve pointers, names and name table entries, the form of the S-language instructions, the kinds of operations which an opcode in an S-language may specify, the call and return operations, and the resolution of names in a procedure specifying the arguments with which the procedure was invoked.

Beginning with problems associated with object addressing, a pointer which directly specifies an address must specify both an object identifier and an offset, and pointers must therefore contain a large number of bits.

Operations involving large pointers are therefore expensive both in terms of fetching and storing the pointers and in terms of processing them. While the extra overhead involved in these operations is not important in the infrequent cases in which a pointer specifies an address indirectly or specifies a location in another object, it interferes markedly with speed and efficiency in the frequent cases in which the pointer simply specifies another address in the object which contains the pointer. Indeed, in these cases, the only relevant information in the pointer is the offset, since the object identifier required for the pointer's value may be obtained from the pointer's own address.

The problems associated with names are similar to those associated with pointers. While a name and its associated name table entry offers a powerful means for dealing with complex references. no name can be resolved without reference to a name table entry and the need to retrieve information from a name table entry markedly increases the number of memory references needed to execute a program. The problems are increased by the fact that a large number of programs do not form complex references and therefore do not need the power provided by the use of names and name table entries. Furthermore, the arrangement of the information in the name table entry is crucial in a digital data system using names, since the length of time required to resolve a name is dependent on the number of fetches from memory required to obtain the information in the name's name table entry.

The problems associated with the S-languages stem from two main sources: first, the physical form of the S-languages is still too complicated to allow the construction of low-cost and efficient hardware parsing devices, and second, the simplicity of the operations described by the S-languages make it difficult to separate certain special types of operations capable of particularly efficient treatment from other operations capable of less efficient treatment.

In the original systems, the S-languages have operation codes of a fixed size, but the operand syllables in a given procedure may have one of a number of sizes. Thus, the hardware parsing device must cope with opcodes and operand syllables which differ in size and with a number of different sizes of operand syllables. Furthermore, it may be necessary to reset the hardware parsing device when a call or return instruction is executed, and it is therefore necessary to save the size of the operand syllables in the calling procedure.

As described above, S-instructions in the original systems specify operations in terms of an operation, locations in memory containing operands for the operation, and a location for the result of the operation. In certain frequent cases, in which the result of a first operation is used immediately as an operand in a second operation, it is more efficient to keep the result of the first operation in the central processing unit, without storing it in memory and retrieving it for the second operation. S-instructions in the original systems have no means of specifying that a result be retained in the central processing unit or that a succeeding S-instruction use the retained result as an operand. Consequently, the S-instruction for the first operation must specify that the result be stored at some location in memory and the S-instruction for the second operation must specify that location as the location of one of the operands. This results in three kinds of inefficiencies: first, additional memory operations are required to store the result of the first operation and fetch it for use in the second operation. Second, additional operand syllables are required to specify the location at which the result of the first operation is to be stored and from which it is to be retrieved, and third, additional memory is required for the temporary storage of the result of the first operation.

Similarly, the use of a single Call instruction requires the inefficient treatment of certain simple cases. At its simplest, a call operation in the original systems requires only the following:

Saving FP, a base pointer specifying the calling procedure's stack frame, SP, a pointer to the top of the calling procedure's stack frame, and the calling procedure's program counter value.

Calculating a new value for the program counter.

Constructing a new frame on the stack for the called procedure and calculating new values for FP and SP.

A return operation need only restore the saved values of the program counter, FP, and SP. Other calls, however, require the retention of much more state. Examples in order of increasing complexity are calls to procedures using different name tables, calls to procedures using different S-languages, calls to procedures contained in different procedure objects, and calls which affect the access control system. Returns from such calls must of course restore the retained state. In the original systems, all Calls and Returns commence as if they are one of the complex cases and do more than is required for the simplest case. Since simple Calls and Returns occur with higher frequency than the others, the result is again slow and inefficient execution of programs.

The fact that names in the original systems are nothing more than indexes of name table entries also prevents maximum use of encachement means for descriptors. Many names in a procedure's S-instructions refer to arguments to the procedure, and these names are resolved by forming a descriptor from a pointer to the argument's location. The pointer to the argument's location must be formed when a call is made and as a linkage pointer, its value will not change during the execution of the called procedure. The pointer is therefore encacheable and the descriptor corresponding to it is available for encachement when the Call S-instruction is executed, but in the original systems, there is no way of determining when the call is made what names the called procedure will refer to the pointers by. Consequently, the pointers cannot be encached when the call is made, but must be encached when a name whose resolution requires the value is presented to the name cache and the value is not present.

The present invention provides data processing system improvements and features which solve the above-described problems and limitations of the original systems.

SUMMARY OF THE INVENTION

The present invention relates generally to digital computer systems and more specifically to improvements in digital computer systems in which instructions include names representing data items. In such systems, certain of the names are table names. Each table name is associated with a name table entry in the memory of the digital computer system. When an instruction containing the table name is executed, a name translator in the processor executing the instruction uses the table name to locate the associated name table entry and then derives the address and length of the data item represented by the name using information in the associated name table entry. The data items include varying-length data items. These data items are made up of elements of a single size. The maximum number of elements in such a varying-length data item is fixed, but the current number of elements in a varying-length data item may vary. Each such varying-length data item has associated with it another data item which indicates the current length of the varying-length data item.

In the present invention, the data item representing the current length, the name table entries associated with table names representing varying-length data items, and the name translator have been improved to speed up processing of the name table entry by the processor. The data item representing the current length in the present invention is a current number of elements item specifying the number of elements currently in the varying-length data item associated with it. The name table entry associated with a table name representing a varying-length data item includes a current number of elements item specifier specifying the address of the current number of elements item associated with the varying-length data item and an element size specifier which specifies the size of the elements in the varying-length data item. The improved name processing means derives the current length of the varying-length data item by using the current number of elements item specifier to obtain the address of the current number of elements item, fetching that item's value to the processor, and using the value and the information in the element size specifier to calculate the length.

The invention further includes various configurations of the current number of elements item specifier and of the element size specifier and various means of representing the length of a data item in a name table entry. Finally, the invention includes methods of calculating the current length of a varying-length data item using the current number of elements item specifier, the current number of elements item, and the element size specifier.

It is thus an object of the invention to provide an improved digital computer system.

It is another object of the invention to provide improved means for calculating the current length of varying-length data items in digital computer systems which represent data by means of names.

It is yet another object of the invention to provide an improved name table entry associated with a name representing a varying-length data item.

BRIEF DESCRIPTION OF DRAWINGS

FIG. 13 is a conceptual diagram of linkage pointer encachement in the present invention.

DESCRIPTION OF THE PREFERRED EMBODIMENT

Introduction

Figure 1:
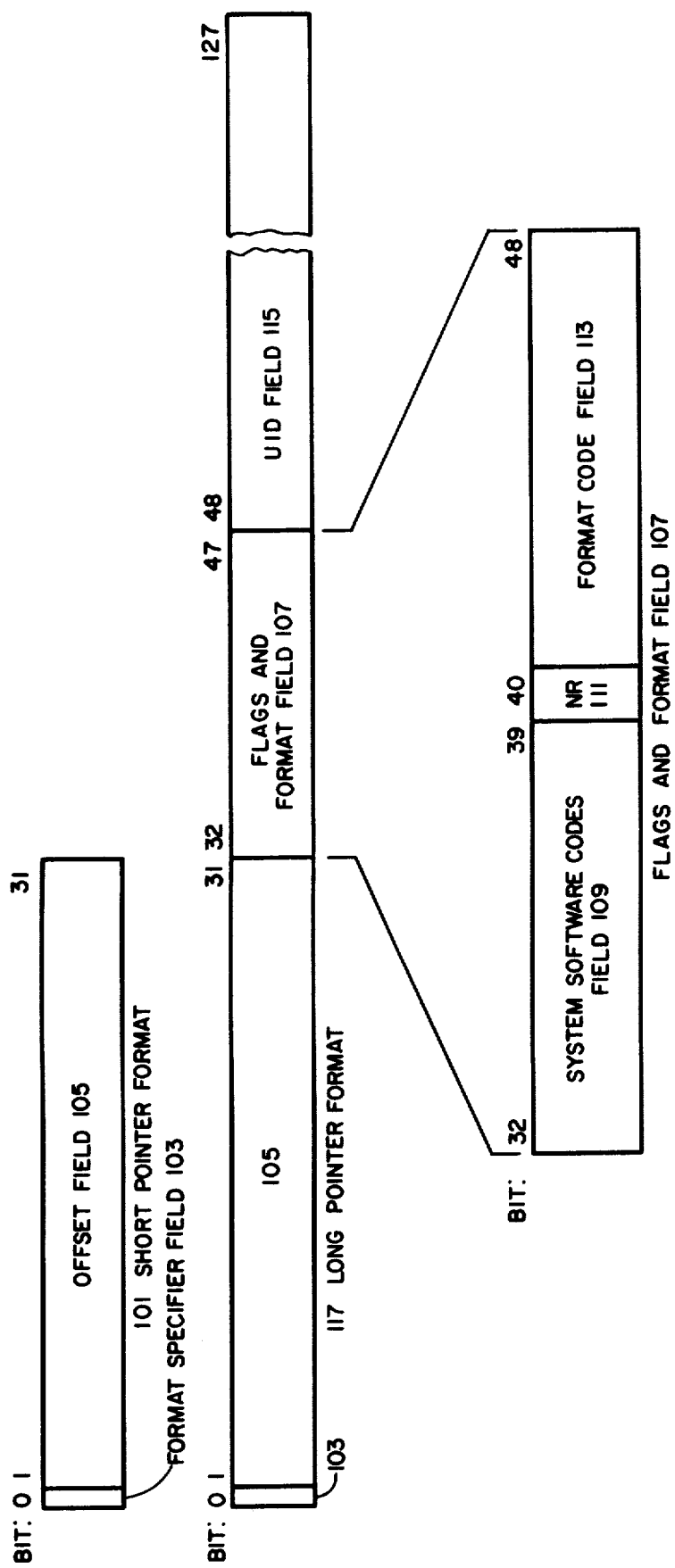
FIG. 1 is a diagram of the improved pointer formats of the present invention.

The inventions disclosed herein were made in the course of continuing development of the original data processing systems described in U.S. patent application Ser. No. 266,539 and related patent applications and may be best understood in the light of U.S. patent application Ser. No. 266,539. U.S. patent application Ser. No. 266,539 is accordingly incorporated by reference into the present application and is referred to throughout the present application. In particular, reference numbers having five digits in the present application refer to figures from U.S. patent application Ser. No. 266,539, while those having three or four digits refer to figures in the present application. In both sets of figures, the rightmost two digits indicate items in the figure whose number is specified by the leftmost digits. Thus, 201 is a reference number specifying FIG. 2 of the present application, while 46865 is a reference number specifying FIG. 468 of U.S. patent application Ser. No. 266,539. Certain reference numbers in U.S. patent application Ser. No. 266,539 have three or four digits. To distinguish these reference numbers from those referring to figures of the present application, the present application expands the former reference numbers to five digits by adding leading 0's. For example, reference number 602 of U.S. patent application Ser. No. 266,539 appears herein as reference number 00602, specifying FIG. 6 of U.S. patent application Ser. No. 266,539.

The digital data processing system (CS 10110) of U.S. patent application Ser. No. 266,539 was described in U.S. patent application Ser. No. 266,539 as a system including hardware and a micromachine, described in Chapter 2 of U.S patent application Ser. No. 266,539, an S-interpreter for interpreting S-instructions (SINs), described in Chapter 3 of U.S. patent application Ser. No. 266,539, and KOS procedures and microcode for providing object addressing, control of access to objects, and processes for executing procedures, all described in Chapter 4 of U.S. patent application Ser. No. 266,539. The inventions described in the present application concern only the S-interpreter portion of CS 10110. The other portions of CS 10110 remain as described in U.S. patent application Ser. No. 266,539. In particular, the embodiment of the inventions described in the present application employs the hardware of CS 10110; the hardware is made to perform the new functions described in the present application by means of microcode specific to this embodiment. The new microcode is included in Appendix A of the present application. As may be seen in the ensuing discussions, other embodiments of the inventions may employ different hardware means.

The inventions described in the present application concern 6 different parts of the S-interpreter portion of the digital data processing system described in U.S. patent application Ser. No. 266,539:

A. Pointers: Pointers in the present invention have two main format types: a 32-bit short format for resolved object-relative pointers and a 128-bit long format for all other kinds of pointers.

B. Namespace: Namespace in the present invention now resolves two kinds of Names: Table Names, corresponding to the Names of CS 10110, and Immediate Names, which may be resolved without reference to a Name Table.

C. The Instruction Stream: All syllables in the Instruction Stream of the present invention are 16 bits long. SOPs now include an 8-bit Opcode Modifier Field as well as an 8-bit Opcode.

D. Accumulator SOPs: The present invention includes an Accumulator which receives the result on every operation involving EU 10122 and which SOPs may specify as a source of data for an operation.

E. General Call, Neighborhood Call, and common Return: The present invention includes General Call SINs for Calls between Procedures which do not share Procedure Environment Descriptors (PEDs) and Neighborhood Call SINs for Calls between Procedures which do share PEDs. The MAS Stack Frame produced by a General Call SIN is an expanded version of the MAS Stack Frame produced by a Neighborhood Call SIN, and the common Return SIN reads flags in the MAS Stack Frame to determine which kind of Call created the MAS Stack Frame and what actions are necessary on return.

F. Linkage Pointer Encachement: Pointer values located at negative offsets from SDP and FP may be encached and may be accessed in the cache by means of Immediate Names.

The parts are described in the order listed above.

A. Pointers

A pointer is a data item which represents an address. In U.S. patent application Ser. No. 266,539 filed May 22, 1981, pointers in CS 10110 are described in Part A of Chapter 3. The following discussion begins with a short summary of pointers in CS 10110 and then presents pointers in the present invention.

1. Pointers in CS 10110

In CS 10110, pointers represent UID-offset addresses. They may do so in two ways: by specifying the UID-offset address they represent directly, or by specifying values which identify information from which the UID-offset address represented by the pointer may be derived by user Procedures 00602 executing on CS 10110. Pointers which specify a UID-offset address directly are termed resolved pointers, and those which do not are termed unresolved pointers. In an unresolved pointer, the information from which the UID-offset address represented by the pointer may be derived may be represented in many different ways. For example, the information may be a UID and offset which is the address of the information required to derive the UID-offset address represented by the pointer, or it may be a value which serves as a key to locate the information in a hash table. Certain unresolved pointers are associative pointers. The UID offset address represented by an associative pointer may be derived and then placed in a table called the Asscciated Address Table (AAT) 30201 accessible to microcode executing on FU 10120, thus accelerating subsequent derivations of the UID-offset address represented by the associative pointer.

The operation of deriving a UID-offset address from an unresolved pointer is called resolving the pointer. The operation begins when microcode executing on FU 10120 detects an unresolved pointer. If the unresolved pointer is not an associative pointer, the microcode performs a microcode-to-software Call to a Procedure 00602 which derives the UID-offset address represented by the unresolved pointer and returns it to the microcode; if the unresolved pointer is an associative pointer, the microcode first attempts to look up the UID-offset address represented by the associative pointer in AAT 30201; if the UID-offset address is not present, it then performs a microcode-to-software Call to a Procedure 00602 which derives the UID-offset address represented by the associative pointer and places it in AAT 30201; on return from the Call, the microcode again looks up the associative pointer in AAT 30201. Pointer resolution is described in detail in Section 3.A.c in U.S. patent application Ser. No. 266,539.

If a resolved or unresolved pointer is located in the same object as that specified by the UID-offset address the pointer represents, the UID specifying the pointer's location and the UID for the address represented by the pointer are the same, and the pointer can represent the UID by means of a flag indicating that the pointer is in the same object as the address it represents. Such pointers are termed object-relative pointers.

In CS 10110, the type of a pointer is determined from its format. FIG. 301 of U.S. patent application Ser. No. 266,539 presents the formats of pointers in CS 10110. Pointers in CS 10110 are 128 bits long and have three main divisions: a 32-bit Offset Field 30103, a 16-bit Flags and Format Field 30105, and an 80-bit UID Field 30115. In resolved pointers, Offset Field 30103 contains the offset of the UID-offset address represented by the pointer. In unresolved pointers, Offset Field 30103 is simply part of the value which identifies the information from which the UID-offset address represented by the pointer may be derived.

Flags and Format Field 30105 is the means by which FU 10120 microcode determines what kind of pointer it is dealing with. The value of NR 30109 indicates whether a pointer is resolved or unresolved, and the value of Format Code 30113 indicates whether the pointer is an object-relative pointer and whether an unresolved pointer is an ordinary unresolved pointer or an associative pointer. The meaning of UID Field 30115, finally, depends on the kind of pointer. In object-relative resolved pointers, UID Field 30115 is meaningless; in UID resolved pointers, UID Field 30115 contains the UID of the UID-offset address represented by the pointer. In unresolved pointers, UID Field 30115, like Offset Field 30103, contains information from which the UID-offset address represented by the pointer may be derived.

As explained in detail in Introductory Overview.B.1 and 2.F.b.2.d.d. of U.S. patent application Ser. No. 266,539, the UID-offset addresses represented by pointers cannot be used directly inside FU 10120, but must instead be converted to Logical Descriptors 27116 in which the address specified by Logical Descriptor 27116's AON Field 27111 and OFF Field 27113 correspond to the UID-offset address specified by the pointer. Consequently, when FU 10120 obtains the UID-offset address of a data item from a pointer, microcode must first resolve the pointer as described above, if the pointer is unresolved, and then convert the UID-offset address represented by the pointer to its corresponding AON-offset address. Similarly, when a resolved pointer value is stored in MEM 10112, microcode must convert the address to be stored from the AON-offset form it has in FU 10120 to the UID-offset form it has in MEM 10112. The conversion from UID-offset address to AON-offset address is termed pointer-to-descriptor conversion, and the inverse conversion is termed descriptor-to-pointer conversion. The manner in which these operations are performed in CS 10110 is described in detail in Section 3.A.d of U.S. patent application Ser. No. 266,539.

2. Improved Pointers

The present invention provides improvements in pointers and pointer operations, retaining the kinds of pointers used in CS 11010 and providing new formats in order to facilitate descriptor-to-pointer conversion and pointer-to-descriptor conversion. The present invention thereby increases the speed of execution of programs.

FIG. 1 is a representation of pointer formats in the present invention. There are two basic pointer formats: Short Pointer Format 101 and Long Pointer Format 117. Short Pointer Format 101 is used for resolved object-relative pointers. Short Pointer Format 101 is 32 bits long and has two fields: the left most bit is Format Specifier Field 103, and the remaining 31 bits are Offset Field 105. The value of Format Specifier Field 103 indicates whether a pointer has Short Pointer Format 101 or Long Pointer Format 117. If the field has the value 0, the pointer has Short Pointer Format 101. The value of Offset Field 105 is the offset of the UID-offset address represented by the pointer. Since Offset Field 105 may only contain 31 bits, the maximum number of bits which may be addressed in an object is $2^{}31-2$ bits, instead of the $2^{}32-1$ bits specified in CS 10110.

Long Pointer Format 117 is used for resolved UID pointers and unresolved pointers. Long Pointer Format 117 contains four major fields: Format Specifier Field 103, Offset Field 105, Flags and Format Field 107, and UID Field 115. Format Specifier Field 103 and Offset Field 105 are identical in size to their equivalents in Short Pointer Format 101. When Format Specifier Field 103 has the value 1, it specifies Long Pointer Format 117. In resolved UID pointers, Offset Field 105 specifies the offset in the UID-offset address represented by the pointer; in unresolved pointers it merely provides information from which the digital computer system may derive the UID-offset address. Flags and Format Field 107 is 16 bits long. It contains information required by the digital computer system of the present invention to interpret Long Pointer Format 117. It will be discussed in more detail below. In UID resolved pointers, UID Field 115 contains a UID. Together with the value of Offset Field 105, the UID specifies the UID-offset address represented by the pointer. In unresolved pointers, UID Field 115, like Offset Field 105 merely provides information from which the digital computer system may derive the UID-offset address represented by the pointer.

Flags and Format Field 107 has three subfields: NR Field 111, System Software Codes Field 109, and Format Code Field 113. Beginning with NR Field 111, NR Field 111 is a single bit which indicates whether the pointer is resolved or unresolved. In Long Pointer Formats 117 for resolved pointers, NR Field 111 has the value 0; in those for unresolved pointers, NR Field 111 has the value 1. In Long Pointer Formats 117 for unresolved pointers, System Software Codes Field 109 contains information used by Procedures 00602 invoked by pointer resolve microde to derive the UID-offset address represented by the pointer. Format Code Field 113, finally, specifies binary values which, together with NR Field 111 and Format Specifier Field 103, determine how the digital computer system of the present invention is to interpret a pointer having Long Pointer Format 117. The following table shows how Fields 103, 111, and 113 cooperate to specify a pointer's type in the present invention:

| Field: | 103 | 111 | 113 | Meaning |
|---|---|---|---|---|
| | 0 | — | — | Short Pointer Format: Resolved Object-Relative Pointer |
| | | | | Long Pointer Format: |
| | 1 | 0 | 0 | Resolved UID Pointer |
| | 1 | 1 | 0 | Associative UID Pointer |
| | 1 | 1 | 1 | Associative Object-Relative Pointer |
| | | | 2..128 | Reserved Codes for Other Resolved and Unresolved Pointer Formats |

3. Null Pointers

A null pointer is a pointer whose value indicates that the pointer does not represent an address. In CS 10110, a null pointer was indicated by setting Format Code Field 30113 to 0; in the present invention, a null pointer is indicated by setting Offset Field 105 to $(2^{}31) - 1$, i.e., by setting all of the bits in Offset Field 105 to 1. Since only $(2^{}31) - 2$ bits of an object may be addressed in the present invention, the value of the null pointer does not address a bit in an object.

4. Advantages of Improved Pointer Formats

The advantages of the improved pointer formats of the present invention stem from the fact that the first bit of any pointer indicates whether the pointer is a resolved object relative pointer. Consequently, in the present invention, pointer processing microcode can determine on the first fetch of a pointer value from MEM 10112 whether extended processing will be required. In CS 10110 as described in U.S. patent application Ser. No. 266,539 by contrast, bits 40 through 47 indicated whether extended processing was required, and thus those bits had to be fetched even when the pointer was a resolved object-relative pointer and consequently contained all of the information actually required to form an AON-offset address in Offset Field 30103. The fact that a resolved object-relative pointer may be identified from the value of Format Specifier Field 103 is particularly important because pointers are most frequently used in CS 10110 and the present invention to specify arguments to Procedures 00602. Generally speaking, arguments used in an invocation of a Procedure 00602 by a Process 00610 are local data contained in other frames of Process 00610's MAS 00502, and are therefore often in the same object as the frame for invoked Procedure 00602. When this is the case, the pointers specifying the arguments are resolved object-relative pointers and have Short Pointer Format 101.

5. Pointer-to-Descriptor Conversion with Improved Pointer Formats

The improved pointer formats of the present invention greatly simplify pointer-to-descriptor conversion for resolved object relative pointers. In the present invention, pointer-to-descriptor conversion is carried out by a microroutine called PTR_TO_DESC. This microroutine's listing appears in Appendix A. PTR_TO_DESC takes a Logical Descriptor 27116 specifying the location of the pointer to be converted as its argument. When PTR_TO_DESC returns, Logical Descriptor 27116 specifies the AON-offset address corresponding to the UID-offset address represented by the pointer to be converted.

PTR_TO_DESC first uses Logical Descriptor 27116 to fetch the first 32 bits of the pointer which is to be converted to a descriptor from MEM 10112 to FU 10120. In the improved pointer formats of the present invention, these 32 bits are Format Specifier Field 103 and Offset Field 105. If Format Specifier Field 103 has the value 0, the pointer has Short Pointer Format 101 and is a resolved object-relative pointer. Consequently, to complete the conversion, PTR_TO_DESC simply copies the 32 bits fetched from MEM 10112 into OFF Field 27113 of Logical Descriptor 27116 and returns.

If Format Specifier Field 103 of the fetched pointer has the value 1, PTR_TO_DESC then fetches the next 32 bits, which includes Flags and Format Field 107. Using the information in Flags and Format Field 107, PTR_TO_DESC then proceeds in substantially the same manner as in CS 10110. If NR Field 111 indicates a resolved pointer, PTR_TO_DESC microcode fetches UID Field 115 and uses LAR microcode (described in 4.B.e.3.c.c of U.S. patent application Ser. No. 266,539) to convert the UID field's value to an AON. Once it has obtained the AON, it copies the AON into Logical Descriptor 27116's AON Field 27111 and the offset from Offset Field 103 into OFF Field 27113. If NR Field 111 indicates an unresolved pointer and Format Code Field 113 an associated pointer, PTR_TO_DESC uses AAT 30201 to obtain the UID-offset address represented by the associated pointer as described in U.S. patent application Ser. No. 266,539 3.A.b, and then converts the UID address to an AON and proceeds as described above. Finally, if NR Field 111 and Format Code Field 113 indicate an unresolved pointer other than an associated pointer, PTR_TO_DESC performs a microcode-to-software Call to Procedures 00602 which resolve the pointer as described in U.S. patent application Ser. No. 266,539 3.A.c.

6. Descriptor-to-Pointer Conversion with Improved Formats

Since all pointer formats in CS 10110 contained at least Offset Field 30103 and Flags and Format Field 30105, descriptor-to-pointer conversion in CS 10110 always stored at least a 48-bit value in MEM 10112. These conversions are described in U.S. patent application Ser. No. 266,539 3.A.d. In the present invention, resolved object relative pointers are completely described by Short Pointer Format 101, and consequently, when a Logical Descriptor 27116 is converted to a pointer, only 32 bits need be stored in MEM 10112.

In the present invention, descriptor-to-pointer conversion is carried out by the DESC_TO_PTR microroutine, listed in Appendix A. DESC_TO_PTR takes two arguments: a first Logical Descriptor 27116 which the microroutine is to convert to a pointer, and a second Logical Descriptor 27116 specifying the location in MEM 10112 where the pointer is to be stored. DESC_TO_PTR first places the value from the first Logical Descriptor 27116's OFF Field 27113 into a register and then sets the value's leftmost bit to 0 if necessary. DESC_TO_PTR next obtains the AONs of the first and second Logical Descriptors 27116 from their AON Fields 27111 and compares them by means of an exclusive or (XOR) operation. If the AONs are the same, i.e., if the XOR operation has 0 as a result, the UID-offset address specifying the pointer's location and the UID-offset address represented by the pointer are in the same object and the pointer is a resolved object-relative pointer. When this is the case, the value of the first Logical Descriptor 27116's OFF Field 27113 is written to MEM 10112 at the location specified by the second Logical Descriptor 27116. At this location, the value forms Format Specifier Field 103 and Offset Field 105 of the pointer. If the AONs are different, the pointer is a resolved UID pointer and the descriptor-to-pointer conversion operation proceeds substantially as explained in U.S. patent application Ser. No. 266,539.

B. Namespace

In descriptions of digital computer systems of the type of CS 10110, Namespace is a collective term for those portions of the system involved in the interpretation of instruction stream syllables specifying operands. In U.S. patent application Ser. No. 266,539, Namespace is described in 3.B.a, b, and c. The following discussion presents improvements in certain elements of Namespace in the present invention. It begins with a summary of these elements as described in U.S. patent application Ser. No. 266,539 and then presents the improved elements of the present invention.

1. Names and Name Table Entries in CS 10110

In the S-instructions (SINs) executed by CS 10110, all operands which represent UID-offset addresses in MEM 10112 or data at locations specified by UID-offset addresses are represented by Names. SINs are contained in Procedures 00602, and as shown in FIG. 103 of U.S. patent application Ser. No. 266,539, each Procedure 00602 has associated with it a Name Table 10350. Each Name in a Procedure 00602 is an index of a Name Table Entry (NTE). The NTE associated with the Name contains information describing the location, length, and type of the operand represented by the Name. The location is described as a displacement from another location termed a base location. In the NTE, the base location, the length, and values used to calculate the location of array elements may be represented by Names referring to other NTEs in Name Table 10350 containing the NTE in question. The NTE, together with UID-offset addresses specified by Architectural Base Pointers (ABPs), is used by CS 10110 to calculate a Logical Descriptor 27116 specifying the location, length, and type of the operand represented by the Name. The operation of using a Name to locate the NTE associated with it and then deriving a Logical Descriptor 27116 from the NTE and from the ABRs is called Name Resolution; once a Name has been resolved, the data at the location specified by Logical Descriptor 27116 may be fetched from MEM 10112 to FU 10120. The operation combining Name Resolution and data fetching is called Name Evaluation. When a NTE itself contains a Name, the Name Resolution or Evaluation operations are performed recursively to obtain the location or value represented by the Name. Name Resolution and Name Evaluation are explained in detail in U.S. patent application Ser. No. 266,539 3.B.c.1 and 3.B.c.3. In CS 10110, information obtained by the Name Resolution operation for a given Name is encached in Name Cache (NC) 10226 in FU 10120. On subsequent Name Resolution operations for that Name, the Name is simply presented to NC 10226, which then automatically makes the encached information available. In simple cases, the encached information is Logical Descriptor 27116 corresponding to the Name; in more complicated cases, a signal from NC 10226 invokes Name Resolve microcode executing on FU 10120. The microcode uses the encached information to produce Logical Descriptor 27116. If there is no information in NC 10226 for the Name, another signal from NC 10226 invokes Name Resolve microcode which performs a Name Resolution operation on the Name and then encaches the information resulting from the Name Resolution operation in NC 10226. Information produced by Name Resolution may be encached in NC 10226 and accessed by means of the Name because there is only one Name Table for a given Procedure 00602, because there is only one NTE in a given Name Table for a given Name, and because the values in the ABPs do not change during an execution of a given Procedure 00602. NC 10226 hardware is described in 2.B.2.b.b of U.S. patent application Ser. No. 266,539, and the method by which Name Resolution microcode maintains NC 10226 is described in 3.B.3.e.e and 3.B.3.f.f.

In CS 10110, a Name is an 8, 12, or 16-bit value with no internal structure, and a NTE has the format shown in FIG. 304 of U.S. patent application Ser. No. 266,539. The format is explained in detail in U.S. patent application Ser. No. 266,539 3.B.a.2; here, the format is explained only in sufficient detail to provide an understanding of the improved NTEs of the present invention. NTE 30401 of CS 10110 may be either a Short NTE 30403 containing 64 bits or a Long NTE 30405 containing 128 bits. As illustrated in FIG. 304, the first 64 bits of a Long NTE 30405 contain the same fields as a Short NTE 30403. Short NTEs 30403 are used for scalar references whose displacements from the base location can be expressed in 16 bits; Long NTEs 30405 are used for array references and scalar references whose displacements cannot be expressed in 16 bits.

The functions of the fields in NTE 30401 may be summarized as follows:

Flags and Format Field 30407 contains information from which Name Resolution microcode determines whether NTE 30403 is a Long NTE 30405 or a Short NTE 30403 and how NTE 30403 is to be interpreted.

Base Field 30425 specifies a base location. Base Field 30425 has three formats: in one, Base Field 30425 is a Name, in the second, Base Field 30425 specifies an ABP, and in the third, it specifies a pointer at a displacement from an ABP. Flags in Flags and Format Field 30407 determine how CS 10110 interpets Base Field 30425.

Length Field 30435 specifies a length in bits. Length Field 30435 may be either a Name or a literal value. A flag in Flags and Format Field 30407 specifies which it is.

DISP Field 30437 specifies a displacement from the base location specified by Base Field 30425. The displacement is always a literal value.

DISP EXT Field 30439 is used together with DISP Field 30437 for displacements which cannot be expressed in 16 bits.

Index Name Field 30441 contains a Name which is evaluated to obtain the value of an array index.

IES Field 30445 contains a Name or a literal value specifying the distance from the beginning of one element of an array to the beginning of the next element of the array. To locate an array element, Name Resolution microcode multiplies the literal value or the value obtained by evaluating the Name by the value obtained by evaluating Index Name Field 30441. Again, whether IES Field 30445 contains a Name or a literal value is specified by a flag in Flags and Format Field 30407.

While Names and Name Table 10350 provided CS 10110 with a powerful and flexible means for specifying operands, the power and flexibility had their price:

The fact that Names could have varying lengths greatly increased the complexity of CS 10110's I-stream parsing mechanisms.

The information required to resolve even simple Names, such as those referring to standard-sized operands located at offsets from ABPs, had to be obtained from Name Table 10350 in MEM 10112.

In order to obtain the information to resolve a Name, a minimum of 64 bits had to be fetched from MEM 10112 to FU 10120.

In the improved Namespace of the present invention, the power and flexibility of Namespace in CS 10110 is retained and the results of Name Resolution operations may still be encached, but Names and the Name Table are improved so that certain Names can be resolved without reference to the Name Table and so that many Names can be resolved by fetching only 32 bits from the Name Table. Further, certain special provisions are made for NTEs specifying string data. These improvements reduce the size of Name Table 10350 and speed Name Resolution and Evaluation, thereby improving the efficiency of CS 10110.

2. Improved Names

Figure 2:
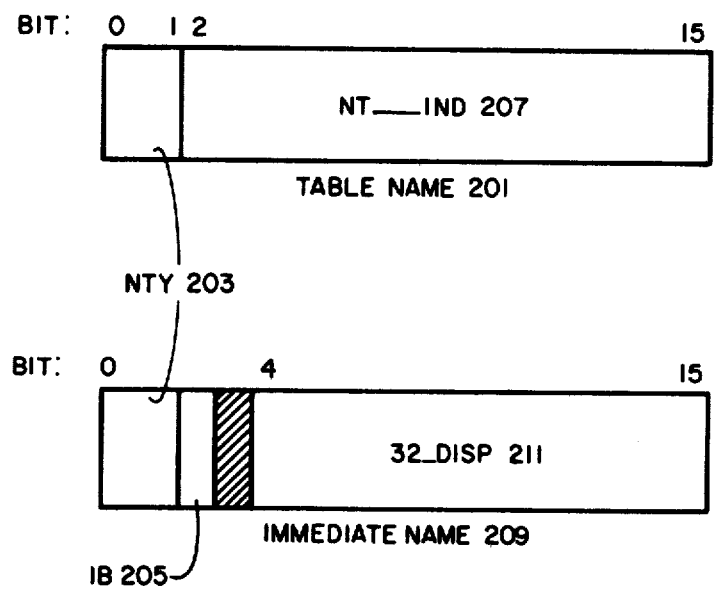
FIG. 2 is a diagram of the improved names of the present invention.

As described above, Names in CS 10110 could vary in length but were all indexes into Name Table 10350. Since Names in CS 110 were simply index values, they had no internal structure. In the present invention, all Names are 16 bits long, but there are two distinct kinds of names: Table Names, which, like the Names in CS 10110, specify NTEs in Name Table 10350, and Immediate Names, which do not specify NTEs and are resolved without reference to Name Table 10350. FIG. 2 shows the formats of Table Names 201 and Immediate Names 209. Both Table Names 201 and Immediate Names 209 have NTY Field 203. NTY Field 203 specifies whether a Name is a Table Name 201 or an Immediate Name 209 and, in the case of Immediate Names 209, further specifies an ABP. The following table gives the codes in NTY Field 203 and their meanings:

| Code in NTY Field 203 | Meaning |
| --- | --- |
| 11 | The Name is a Table Name |
| 00 | Immediate Name; ABP = FP |
| 01 | Immediate Name; ABP = SDP |
| 10 | Immediate Name; ABP = PBP |

In a Table Name 201, the remaining 14 bits make up NT—IND Field 207, which specifies the index in a Name Table of the NTE corresponding to the Table Name. In an Immediate Name 209, the remaining 14 bits contain two fields: IB Field 205 and 32—DISP Field 211. IB Field 205 is a one-bit flag which indicates whether the operand represented by Immediate Name 209 may be located directly or indirectly. If IB Field 205 is set to 0, the operand represented by Immediate Name 209 is at the location specified by Immediate Name 209; if IB Field 205 is set to 1, the location specified by Immediate Name 209 contains a pointer and the pointer's value gives the location of the operand represented by Immediate Name 209.

The bit following IB Field 205 is reserved, and the remainder of Immediate Name 209 is occupied by 32—DISP Field 211. 32—DISP Field 211 contains a signed integer value which, when multiplied by 32, provides a displacement from the ABP specified in NTY Field 203.

3. Name Resolution

Figure 3:
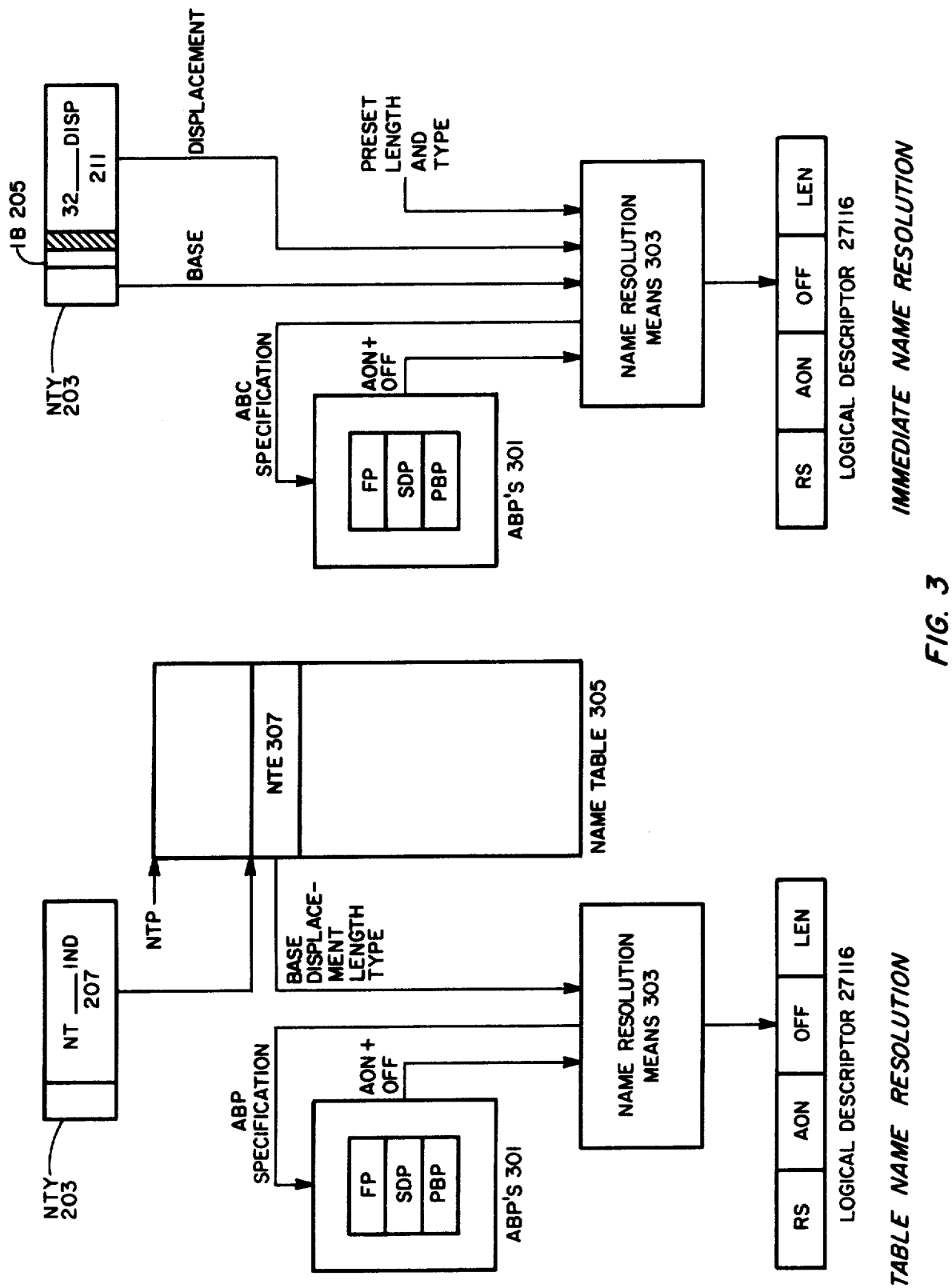
FIG. 3 is a diagram illustrating the resolution of table names and immediate names in the present invention.

In CS 10110, all Names were resolved by means of Name Table 10350; in the improved digital computer system of the present invention, Table Names 201 are resolved by means of the Name Table and Immediate Names are resolved without the Name Table. FIG. 3 provides a conceptual overview of the different methods of Name Resolution in the present invention. Name Resolution Means 303 in FIG. 3 corresponds to Name Resolution microcode and NC 10226 in the present implementation. Name Resolution Means 303 is responsive to the value of NTY Field 203 and determines which method to use by the value of that Field in the Name being resolved. Beginning with Table Name Resolution, this proceeds in the same manner as Name Resolution in CS 10110. Field NT—IND 207 of Table Name 201 contains an index indicating an NTE 307 in Name Table 305. NTE 307 contains information describing the base location, displacement, length and type of the operand specified by Table Name 201, and Name Resolve Means 303 uses the information from NTE 307 together with the current values of ABPs 301 to produce Logical Descriptor 27116 for the operand represented by the Name.

Immediate Name Resolution, on the other hand, proceeds without reference to a NTE 307. The base and displacement information required to resolve an Immediate Name 209 is provided by Immediate Name 209, and the RS and LEN Fields of Logical Descriptor 27116 are set to standard values. To obtain the values of the AON and OFF fields, Name Resolve Means 303 multiplies the value of 32—DISP Field 211 by 32 to obtain a displacement and then adds this displacement to the AON-offset form of the UID address contained in the ABP. Under SOP control, FU 10120 can override the standard values in the RS and LEN Fields. For example, if Immediate Name 209 appears at a location specified for an arithmetic operand in an integer arithmetic SIN, the SOP microcode will treat Logical Descriptor 27116 produced by Name Resolve Means 303 as a Logical Descriptor 27116 specifying an integer value. Similarly, if Immediate Name 209 appears where an operand specifying a pointer is required, the SOP microcode will treat Logical Descriptor 27116 as a a Logical Descriptor 27116 specifying a pointer value.

If IB 205 is set to 1 in Immediate Name 209, the Name Resolution operation proceeds as just described, except that Name Resolution Means 303 responds to IB Field 205 by fetching the pointer at the location specified by Immediate Name 209's NTY Field 203 and 32—DISP Field 211 and performing a pointer-to-descriptor translation on that pointer in order to obtain Logical Descriptor 27116 for the operand represented by Immediate name 209.

4. Encachement of Information for Name Resolution

As already mentioned, Name Resolution in CS 10110 is speeded up by encaching information obtained by the Name Resolution operation in NC 10226. In the present invention, information obtained from the resolution of both Table Names 201 and Immediate Names 209 may be encached. Table Names 201 are equivalent to the Names of CS 10110 and may be encached as they are. Immediate Names 209 are not indexes into Name Table 305, but encachement is possible because the UID-offset addresses specified by ABPs 301 do not change their values while SINs in a given execution of a Procedure 00602 are being interpreted by FU 10120. Consequently, all Immediate Names 209 specifying a given ABP in NTY Field 203 and having a given value in 32—DISP Field 211 specify the same Logical Descriptor 27116 and that Logical Descriptor 27116 may be encached. Furthermore, since Immediate Names 209 and Table Names 201 have different codes in NTY Field 203, they may function as keys to the same cache. In the embodiment of the present invention described herein, both Immediate Names 209 and Table Names 201 are used as keys for NC 10226. If an Immediate Name 209 is presented to NC 10226 and NC 10226 contains no information for that Immediate Name 209, NC 10226 produces a signal invoking Name Resolution microcode. Name Resolution microcode then resolves Immediate Name 209 and places the resulting information in NC 10226. In other embodiments of the present invention, Logical Descriptors 27116 corresponding to certain Immediate Names 209 may be separately encached.

5. Improved NTEs 307

Figure 4:
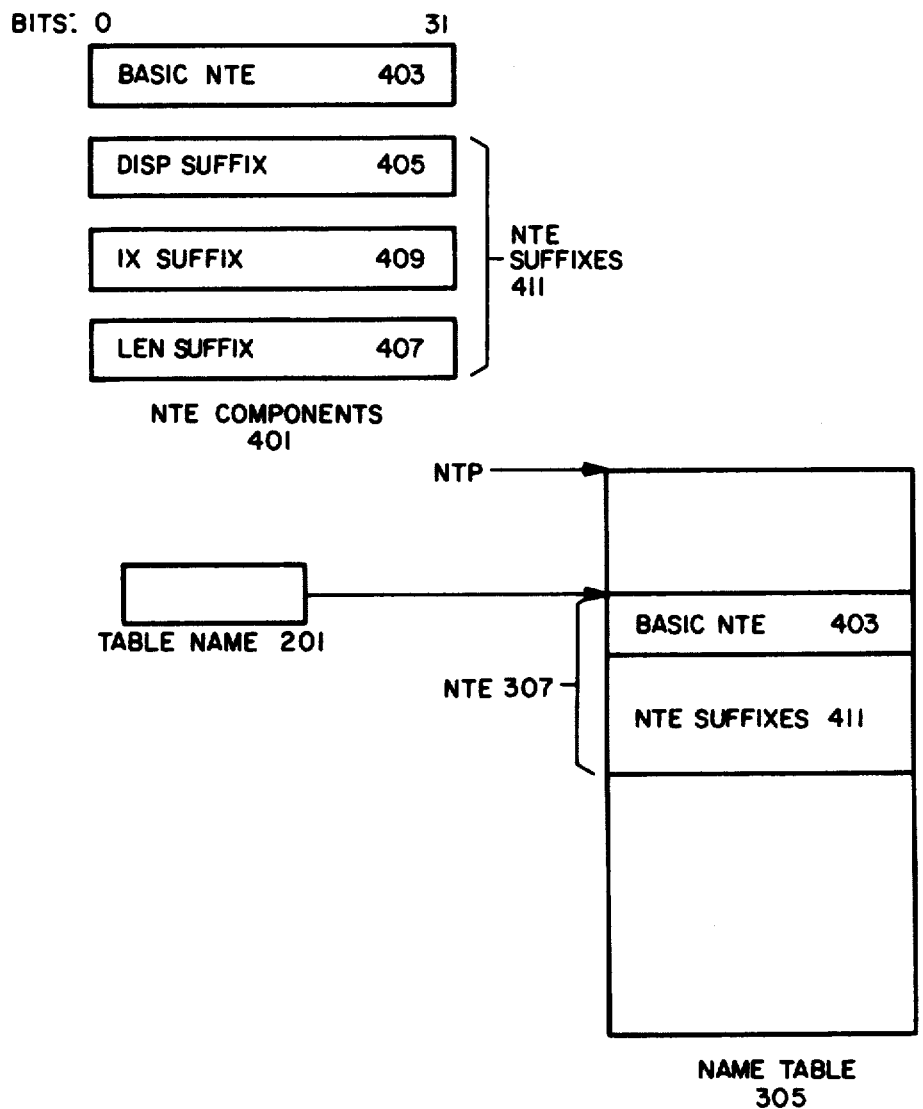
FIG. 4 is a diagram providing an overview of the improved name table of the present invention.

As previously mentioned, NTEs 307 in the present invention have formats which allow many Table Names 201 to be resolved after the first 32 bits of NTE 307 specified by Table Name 201 have been fetched from from MEM 10112 to FU 10120. FIG. 4 presents an overview of Name Table 305 and NTE 307 in the present invention. Table Name 201 specifies the location of a NTE 307 in Name Table 305. NTE 307 is made up at least of Basic NTE 403. In some cases, a NTE 307 consists only of a Basic NTE 403. Indexes in Table Names 201 always specify locations of Basic NTEs 403. However, if a NTE 307 is an NTE 307 for array or string data, if it specifies a large displacement, or if it specifies a long or non-constant length, a NTE 307 further consists of one or more NTE Suffixes 411. DISP Suffix 405 is used if NTE 307 specifies a large displacement, LEN Suffix 407 is used if NTE 305 has a large length or specifies certain string data, and IX Suffix 409 is used if NTE 305 is an array NTE 307. A given NTE 307 may have up to three NTE Suffixes 411. Only one NTE Suffix 411 of each kind may appear in a given NTE 307, and the suffixes always have the order in which they appear in FIG. 4. Flags in Basic NTE 403 specify which NTE Suffixes 411 follow Basic NTE 403 and how such NTE Suffixes 411 are to be interpreted.

Basic NTE 403, IX Suffix 409, and LEN Suffix 407 may themselves contain Table Names 201 or Immediate Names 209. When a Table Name 201 specifying an NTE 307 is resolved, the Names in NTE 307 are resolved or evaluated as required to produce Logical Descriptor 27116 corresponding to Table Name 201. Names in NTEs 307 differ from those in SINs in only one respect: Immediate Names 209 in NTEs 307 may not specify an indirect reference from PBP.

Figure 5:
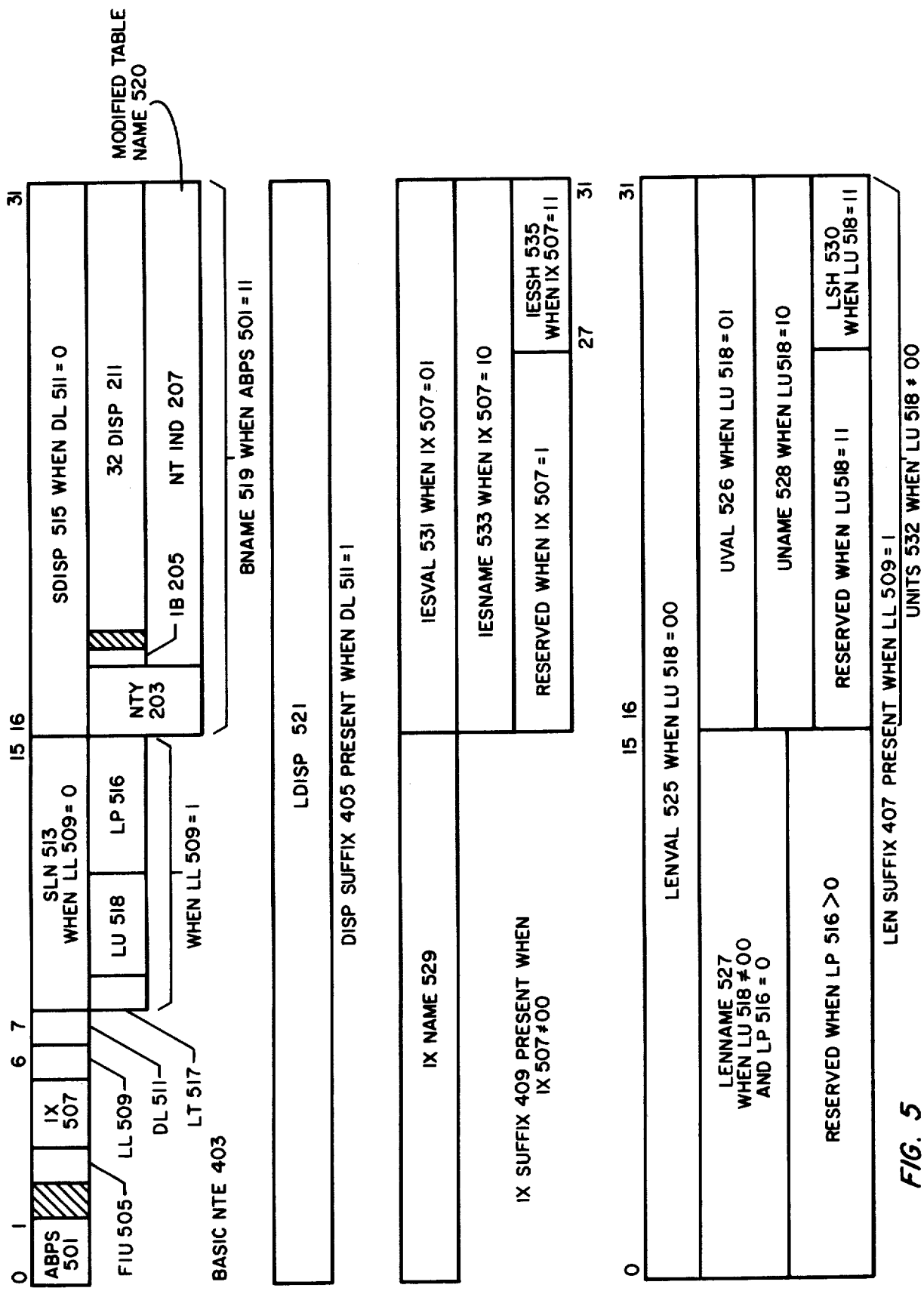
FIG. 5 is a detailed diagram of the improved name table entries of the present invention.

Turning now to FIG. 5, there is presented a detailed illustration of NTE 307 of the present invention. As explained above, NTE Suffixes 411 may or may not be present in a NTE 307, depending on the settings of flags in Basic NTE 403. In FIG. 5, the conditions under which each NTE Suffix 411 is present are specified with the suffix. Further, parts of Basic NTE 403, LEN Suffix 407, and IX Suffix 409 may have alternate fields, again depending on the settings of flags in Basic NTE 403.

In FIG. 5, these alternate fields are represented by placing them below the parts of Basic NTE 403 or NTE Suffix 411 which they occupy. The conditions under which the field has the meaning is specified with the alternate. For example, bits 16 through 31 of Basic NTE 403 contain the field SDISP 515 when DL Field 511 is set to 0 and the field BNAME 519 when ABPS Field 501 is set to the value 11.

Beginning with Basic NTE 503, bits 1 through 7 of Basic NTE 503 contain flag fields which specify the form of NTE 307 containing Basic NTE 503 and the manner in which the fields of NTE 307 are to be interpreted. The first of these fields is ABPS Field 501. If NTE 307 specifies an ABP as its base and the data is referenced directly, then ABPS Field 501 specifies the ABP; otherwise, it specifies that the data represented by NTE 307 is referenced indirectly and/or that NTE 307 specifies its base by means of a Name. The codes in ABPS Field 501 and their meanings are the following:

| ABPS Code | Meaning |
| --- | --- |
| 00 | FP ABP |
| 01 | SDP ABP |
| 10 | PBP ABP |
| 11 | Base is a Name or NTE 307 specifies an indirect reference |

Bit 3 of Basic NTE 403 is reserved; bit 4 contains FIU Flag 505. FIU Flag 505 indicates whether data specified by NTE 307 is to be zero-filled or sign-filled when it is fetched from MEM 10112. A value of 0 specifes zero fill, and a value of 1 specifies sign fill.

IX Field 507 specifies whether NTE 307 has an IX Suffix 409 and the manner in which Name Resolution Means 303 is to interpret IX Suffix 409. The codes in IX Field 507 and their meanings will be discussed in detail together with IX Suffix 409. LL Field 509 specifies the location of length information in NTE 307. If LL Field 509 has the value 0, SLEN Field 513 in Basic NTE 403 contains a literal value specifying the length and there is no LEN Suffix 407. If LL Field 509 has the value 1, there is a LEN Suffix 407 and SLEN Field 513 is replaced by LU Field 518 and LP Field 616, which together specify how Name Resolution Means 303 is to interpret LEN Suffix 407. The meanings of these fields will be discussed in detail together with LEN Suffix 407. DL Field 511, finally, indicates the location of displacement information in NTE 307. If DL Field 511 has the value 0, SDISP Field 515 contains the displacement information and there is no DISP Suffix 405. Otherwise, DL Field 511 has the value 1, indicating the presence of DISP Suffix 405. DISP Suffix 405 contains a single field, LDISP 521, and this field's value is the displacement.

BNAME Field 519 contains base information when ABPS Field 501 has the value 11. As stated above, ABPS Field 501 has that value when NTE 307's base is a Name and/or the data specified by NTE 307 is referenced indirectly. BNAME Field 519 contains either an Immediate Name 209 or a modified version of Table Name 201. An Immediate Name 209 in BNAME Field 519 specifies an indirect reference using a pointer found at a displacement from either the FP or the SDP ABP. Consequently, Immediate Name 209's IB Field 205 is always set to 1 and its NTY Field 203 is set to either 00 or 01, specifying FP or SDP. Immediate Name 203 may not specify PBP. Modified Table Names 520 in BNAME Field 519 are Table Names 201 which have been modified to specify either a direct or indirect reference whose base location is obtained from NTE 307 specified by Modified Table Name 520. Modified Table Names 520 are distinguished from Table Names 201 by the use of NTY Field 203. In Table Names 201, NTY Field 203 must be set to 11; in Modified Table Names 520, it may have the values 11 and 10. The value 11 indicates that Modified Table Name 520 specifies a direct reference and the value 10 indicates that Modified Table Name 520 specifies an indirect reference. The latter value is available for use in Modified Table Names 520 because, as noted above, Immediate Names 209 in BNAME Field 519 cannot specify PBP.

Turning now to the detailed representations of NTE Suffixes 411, DISP Suffix 405 contains a single field, LDISP 521, which contains a signed 32-bit value specifying a displacement from the base indicated by NTE 307 to which DISP Suffix 405 belongs. As mentioned above, DISP Suffix 405 is present only if SDISP Field 515 is not present or is too short to specify the displacement. DISP Suffix 405's presence is specified by DL Field 511.

IX Suffix 409 has two parts. Bits 0 to 15 contain IX-NAME Field 529, while bits 16 to 31 contain three alternate fields: IESVAL 531, IESNAME 533, and IESSH 535. IXNAME Field 529 contains a Table Name 201 or an Immediate Name 209 which represents data used as an index in a reference to an element of an array. When Table Name 201 specifying NTE 307 containing IX Suffix 409 is resolved, the Name in IX-NAME Field 529 is evaluated to obtain the index value. The alternate fields in bits 16 to 31 specify the distance separating the first bits of elements of the array. That distance, multiplied by the index value obtained by evaluating the Name in IXNAME Field 529, yields the location of an element of the array. Which of the alternate fields is present is indicated by codes in IX Field 507 in Basic NTE 403. The codes are as follows:

| Code in IX Field 507 | Meaning |
| --- | --- |
| 00 | IX Suffix 509 not present. |
| 01 | IX Suffix present, bits 16–31: IESVAL 531 |
| 10 | IX Suffix present, bits 16–31: IESNAME 533 |
| 11 | IX Suffix present, bits 27–31: IESSH 535 |

The alternate fields in bits 16 to 31 represent the distance between elements of arrays in three ways:

IESVAL 531 contains a 16-bit literal value which specifies the distance between elements.

IESNAME 533 contains a Table Name 201 or an Immediate Name 209 upon which a Name Evaluation Operation is performed to obtain a value specifying the distance between the elements.

IESSH 535 contains a 5-bit value specifying a power of two. The value obtained from IXNAME 529 is multiplied by this power of 2 (i.e., shifted to the left that many bits) to obtain the location of the array element.

LEN Suffix 407, present only if LL Field 509 has the value 1, is used for two purposes:

To specify data whose length in bits is greater than the length which can be specified by SLEN Field 513 in Basic NTE 403.

To specify data whose length may vary during execution of the program.

Data whose length may vary during the execution of a program is typically string data, that is, data made up of an arbitrary sequence of elements of some data type. Most high-level languages have character-string data, in which the elements making up the sequence are representations of characters. Other high-level languages additionally have bit-string data, in which the elements making up the sequence are single bits, and a few have string data whose elements may have any data type. Typically, string data whose length may vary contains a value specifying the number of elements currently in the string in addition to the elements making up the string data's current value. The value specifying the number of elements is termed a dope vector value. The dope vector value is generally located just ahead of the first element in the string. The address of a string generally specifies the location of the first element of the string, and the dope vector is located by means of an offset from the string's address. LEN Suffix 407 of the present invention makes special provision for the facts that the elements of different kinds of string data may have different sizes, that 8-bit elements are particularly frequent, and that string data typically has a dope vector value.

In CS 10110, variable-length strings have NTEs specifying a Name which is evaluated to obtain the string's length in bits, The Name generally specifies a dope vector, and the dope vector must consequently specify the number of bits, not the number of elements in the string. Consequently, the frequent operations which interrogate the dope vector to determine the number of elements currently in the string must divide the dope vector by the size of the elements. In the present invention, a Name is no longer required to locate the dope vector. Furthermore, the length of a string is be obtained by multiplying a value specifying a length by a value specifying the size of a unit, and the dope vector can thus specify the current number of elements in the string instead of the current number of bits. Finally, as with arrays, the present invention takes advantage of the fact that elements of many strings have sizes that are powers of 2 to accelerate the calculation of the string's length. LEN Suffix 407 has three basic forms:

It may contain the single 32-bit field LENVAL 525. LENVAL 525 contains an unsigned literal value specifying the length of the data item represented by Table Name 201 corresponding to NTE 307 to which LEN Suffix 407 belongs.

It may be two 16-bit fields, one, LENNAME 527, containing a Table Name 201 or Immediate Name 209 which, when evaluated, yields the number of elements in the data item represented by Table Name 201 corresponding to NTE 305 to which LEN Suffix 407 belongs and another, UNITS 532, which yields a value specifying the size of the elements in the data item.

It may be UNITS Field 532 by itself. In this case, the number of elements is obtained from the dope vector.

UNITS Field 532 contains three alternate sets of fields for representing the size of the elements:

UVAL Field 526 contains a positive integer value representing the size of the elements.

UNAME Field 528 contains either a Table Name 201 or an Immediate Name 209. When the Name is evaluated, it yields an integer value representing the size of the elements.

LSH Field 530 contains a 5-bit value specifying a power of 2. The value specifying the number of elements in the data item is multiplied by this power of 2 (i.e. shifted to the left that many bits) to obtain the length of the data item.

The manner in which LEN suffix 407 is interpreted by Name Resolve microcode is determined by the values of LU Field 518 and LP Field 516 in Basic NTE 403. LU Field 518 has the primary role here, and LP Field 516 is interpreted only when the length information for the data item is contained in a dope vector. LU Field 518 has the following codes:

| Code in LU Field 518 | Meaning |
| --- | --- |
| 00 | LEN Suffix 407 consists of LENVAL 525 |
| 01 | UNITS 532 is UVAL 526 |
| 10 | UNITS 532 is UNAME 528 |
| 11 | UNITS 532 is LSH 530 |

If LU 518 has a value other than 0 and LP 516 has a value greater than 0, finally, the length information is contained in a dope vector. In this case, LP 516 is interpreted. LP 516 contains a positive integer value ranging from 0 to 32 which specifies the number of bits ahead of the data item's address at which the dope vector begins. LP 516 thus makes it possible to specify the location of the dope vector without using a name and to fetch the dope vector's value without a name resolution operation.

The advantages of NTEs 307 having the format just described may be summed up as follows:

NTEs 307 for Table Names 201 representing scalar data with lengths of 127 bits or less and either a Name as a base or a displacement of up to $(2**15)-1$ from an ABP are made up of a single 32-bit Basic NTE 403. In CS 10110, all NTEs were at least 64 bits long.

Most other scalar data can be represented by a Basic NTE 403 with either a DISP Suffix 405 or a LEN Suffix 407, and therefore in the same 64 bits which was the minimum size of a NTE in CS 10110.

Elements of many arrays can be represented by a Basic NTE 403 and an IX Suffix 409; elements of most other arrays can be represented by adding either a DISP Suffix 405 or a LEN suffix 407; in CS 10110, all array NTEs required 128 bits.

Immediate Names 209 may be more quickly resolved than Table Names 201, and consequently, the use of Immediate Names 209 in NTEs 307 speeds the resolution of these NTEs 403. Since Immediate Names 209 have no NTEs 307, their use also reduces the size of Name Table 305.

IESSH Field 435 and LSH Field 530 both directly specify a shift operation therefore allow more rapid resolution of array NTEs and NTEs for strings in the frequent cases where the distance between the elements is a power of 2.

UNITS Field 532 allows the dope vector to contain the number of units in the string, instead of the number of bits.

LP Field 516 in Basic NTE 403 makes it possible to locate a dope vector for a string without resolving a Name.

6. Combined Advantages of Immediate Names 209 and NTEs 307

In combination, Immediate Names 209 and NTEs 307 are particularly powerful. This may be shown by repeating the FORTRAN example of U.S. patent application Ser. No. 266,539 3.B.c.3.a.a for the present invention. As shown in U.S. patent application Ser. No. 266, 539 3.B.c.3.a.a, the FORTRAN compiler generated Names from following declarations:

SUBROUTINE SORT (LIST)
INTEGER LIST (10)
INTEGER I, N, TEMP

Figure 6:
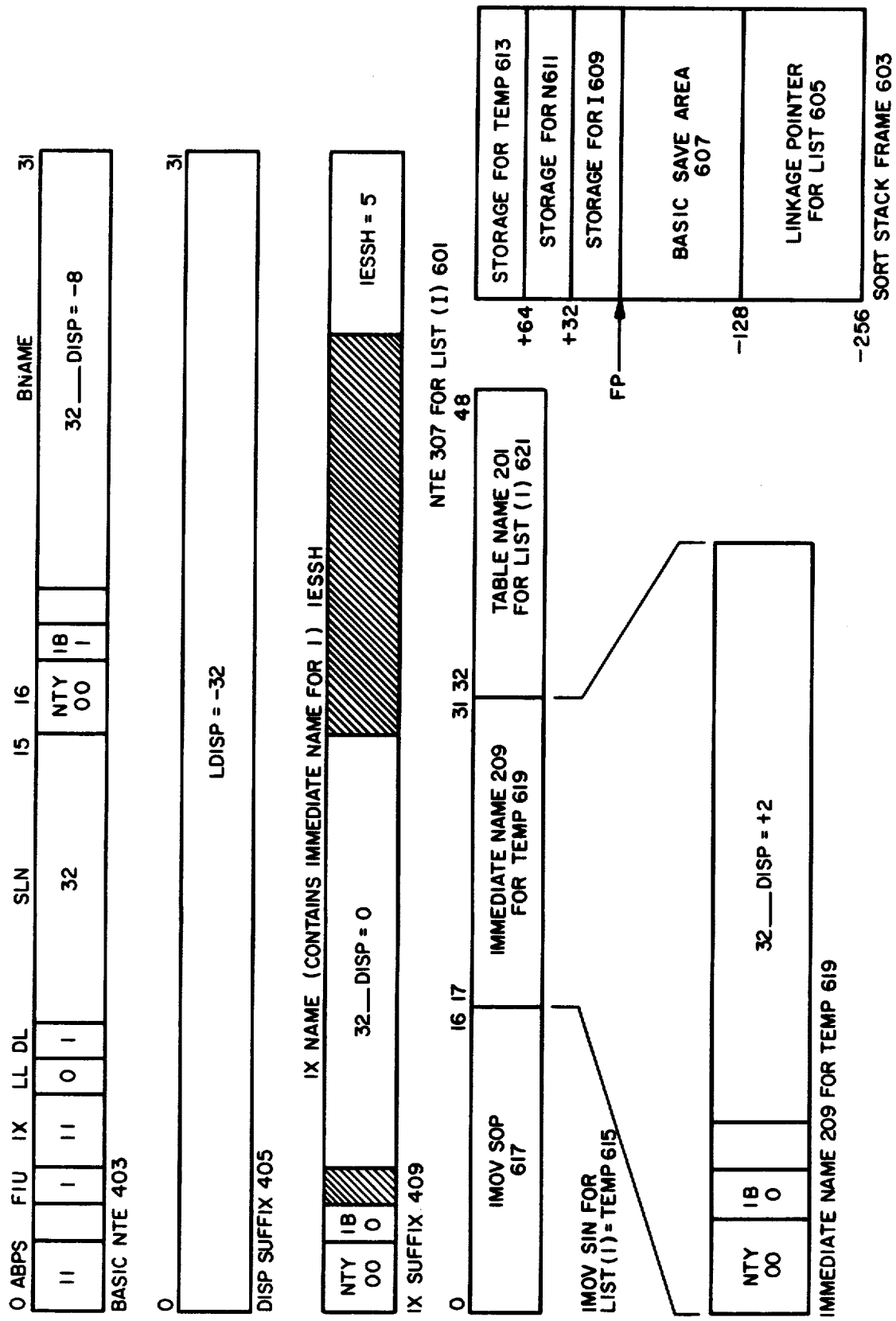
FIG. 6 is a diagram of a typical S-instruction, the name table entries for its names, and the stack frame for the procedure containing the S-instruction in the present invention.

FIG. 305 of U.S. patent application Ser. No. 266,539 shows the stack frame for an invocation of SORT and the NTEs for I and LIST(I). FIG. 6 of the present application shows Stack Frame for SORT 603 and NTE for LIST(I) 601 in the present invention. In addition, it shows the IMOV SIN for LIST (I)=TEMP 615. This SIN is generated by the FORTRAN compiler from the FORTRAN statement

LIST (I)=TEMP in SORT. The equivalent SIN is not shown in FIG. 305 of U.S. patent application Ser. No. 266,539, but as is obvious from the discussion of SINs in U.S. patent application Ser. No. 266,539, it consists of an SOP, a Name for TEMP, and a Name for LIST(I).

Turning first to SORT Stack Frame 603, it is substantially equivalent to SORT Stack Frame 30501. Storage for the 32-bit local data I, N, and TEMP is at positive displacements from FP and storage for the linkage pointer to the actual for the formal argument LIST is at a negative displacement from FP. An additional area, Basic Save Area 607 is located between FP and Linkage Pointer for LIST 607, but this area is relevant to this discussion only to the extent that it affects the location of Linkage Pointer for LIST 605.

Turning now to NTE for LIST(I) 601, NTE for LIST(I) 601 consists of a Basic NTE 403, a DISP Suffix 405, and an IX Suffix 409. DISP Suffix 405 is required because the index of the first element of a FORTRAN array is 1 instead of 0, and consequently, the address produced by multiplying the index value by the distance between the elements is always that of the element following the desired element. To correct for this, the compiler includes DISP Suffix 405 in NTE for LIST(I) 601, negates the distance between elements of the array, and sets DISP Suffix 405 to that value. In the Name Resolution operation, the value of DISP Suffix 405 is added to the value produced from the index value and the distance between element of the array, so that the address is that of the desired element instead of the following element.

Beginning with Field ABPS in NTE for LIST (I) 601, that field is set to 11. The setting is a consequence of the fact that LIST is a formal argument. Its base location is contained in Linkage Pointer for List 605 and references to LIST are indirect. The FIU Field is set to 1 because integer values are sign extended. The IX Field is set to 11, indicating that there is an IX Suffix and that the IESSH Field is present in that suffix. The LL Field is set to 0, indicating that the SLEN Field contains the length information. The DL Field is set to 1, indicating the presence of a DISP Suffix, and the SLEN Field is set to 32, the length of the integer values in LIST. As indicated by the setting of the ABPS Field, the last 32 bits of the Basic NTE are occupied by Field BNAME. Since Linkage Pointer for LIST 605 is in SORT Stack Frame 603, Field BNAME contains an Immediate Name 209 specifying Linkage Pointer for List 605 and an indirect reference. The NTY Field in BNAME is therefore set to 00, specifying FP, the IB Field is set to 1, specifying an indirect reference, and the 32_DISP Field specifies −8, which, when multiplied by 32, gives the displacement of Linkage Pointer for List 605 from FP.

As previously mentioned, the DISP Suffix in NTE for LIST(I) 601 contains −32, the value required to correct for the fact that the index of the first element of a FORTRAN array is 1. Continuing with the IX Suffix, the IXNAME Field contains a Name representing I. Since I is local data, it may be located by a displacement from FP, and consequently, the IXNAME Field contains an Immediate Name 605. In that Immediate Name, the NTY Field is set to 00, specifying FP, the IB Field is set to 0, specifying a direct reference, and the 32_DISP Field is set to 0, specifying I's displacement from FP. The remaining 16 bits of the IX Suffix contain the IESSH Field, as specified by the IX Field in the Basic NTE. The IESSH Field contains the value 5, since 32, the distance between array elements in LIST, is 2 raised to the 5th power.

Turning now to IMOV SIN for LIST(I)=TEMP 615, the IMOV SIN consists of the SOP and two Names: one representing the source of the value to be assigned and the other representing the destination to which it is to be assigned. In the IMOV of FIG. 615, the first Name is Immediate Name for TEMP 619 and the second is Table Name for LIST(I) 621. The storage for TEMP is located at a displacement of 64 bits from FP, and consequently, the NTY Field in Immediate Name for TEMP 619 is set to 00, the IB Field is set to 0, and the 32_DISP Field is set to 2, which, when multipled by 32, yields 64. The contents of Table Name for LIST(I) 621 specify the location of NTE for LIST(I) 601 in Name Table 305 for SORT.

When IMOV SIN for List(I)=TEMP 615 is executed, the first Name is evaluated and the second is resolved. Since Immediate Name for TEMP 619 is an Immediate Name 209, it is resolved and evaluated without reference to Name Table 305. The resolution of Table Name for LIST(I) 621 requires NTE for LIST(I) 601. The resolution involves the following operations:

The base location is obtained by resolving Immediate Name 209 in the BNAME Field. Since Immediate Name 209 specifies an indirect reference, the Name Resolve Operation first locates and then evaluates Linkage Pointer for List 605.

The index value is obtained by evaluating Immediate Name 209 in the IXNAME Field of the IX Suffix.

The displacement is calculated by shifting the index value to the left as specified by the IESSH Field, subtracting the value of the LDISP Field, and adding the result to the base location.

Since the Names in NTE for LIST(I) 601 are all Immediate Names 209, they can be resolved without further reference to Name Table 305 and only NTE for LIST(I) 601 need be fetched from MEM 10112.

In the IMOV SIN of CS 10110, three NTEs were required for the Names in the SIN and the NTE; furthermore, references to Name Table 10350 were required to resolve all three names; with the improved Names and NTEs 307 of the present invention, only a single Table Name 201 is required and only one of the Name Resolution operations need refer to Name Table 305. Moreover, in CS 10110, two of the three references were to 64-bit NTEs, and the third was to a 128-bit NTE. Consequently, 256 bits of NTE had to be fetched from MEM 10112 to FU 10120. With the improved Name Table Entries of the present invention, only a single 96-bit NTE need be fetched.

7. Implementation of Name Resolution and Evaluation in the Present Invention The implementation of Name Resolution and Evaluation in the present invention is substantially the same as in CS 10110. A Name is first presented to NC 10226. If a hit occurs, NC 10226 produces either the Logical Descriptor 27116 corresponding to the Name or a JAM signal which invokes FU 10120 Name Resolve Microcode. The microcode invoked by the JAM signal then produces a Logical Decriptor 27116 from the information in NC 10226 for the Name. If a miss occurs, another JAM signal invokes further FU 10120 Name Resolve Microcode which resolves the Name as described above and then makes a NC 10226 Entry for the Name. Such changes in the microcode as are necessary to accomocate Immediate Names 201 and improved NTEs 305 are immediately apparent to one skilled in the art, as may be seen from the RESOLVER_TRAPS and RESOLVER microcode.

C. The I-Stream

When JP 10114 executes a Procedure 00602, it fetches and executes a sequence of SINS from Procedure 00602. The sequence of SINs being executed by JP 10114 is termed the Instruction Stream (I-stream). As described in U.S. patent application Ser. No. 266,539, the I-stream of CS 10110 is made up of eight-bit SOPs and operand syllables having lengths of 8, 12, or 16 bits. All operand syllables in a given Procedure 00602 have the same size and a field in PED 30305 belonging to a given Procedure 00602 specifies the operand syllable size for that Procedure 00602. The operand syllables in the I-stream can be either Names specifying NTEs containing location, type, and length information for the operands represented by the Names or Literal Syllables containing signed values used directly as data by JP 10114. The I-stream in CS 10110 is described in detail in U.S. patent application Ser. No. 266,539 3.B.3.g.g. and h.h.

While the I-stream in CS 10110 was more regular, and therefore more adapted to high-speed parsing than the I-streams of other digital computer systems having S-languages, experience with CS 10110 showed that still more regularity was desirable:

The use of SOPs whose size differed from that of the operand syllables required complicated parsing mechanisms and made the task of building cost-effective small versions of CS 10110 more difficult.

Name Tables 10350 tended to be large, and consequently, 8-bit and 12-bit Names were infrequently used.

The restriction of opcodes to 8 bits made it necessary to place information required for the execution of certain SOPs in a Literal Syllable following the opcode. The Literal Syllable increased the size of the SIN and execution of the SIN was slowed because an additional parsing operation was required to obtain the information in the literal syllable.

Since different Procedures 00602 had different syllable sizes, the syllable size had to be saved and restored when Call and Return SINs were executed and when a Virtual Processor 00612 was removed from JP 10114 and then rebound to JP 10114.

1. The Improved I-stream

Figure 7:
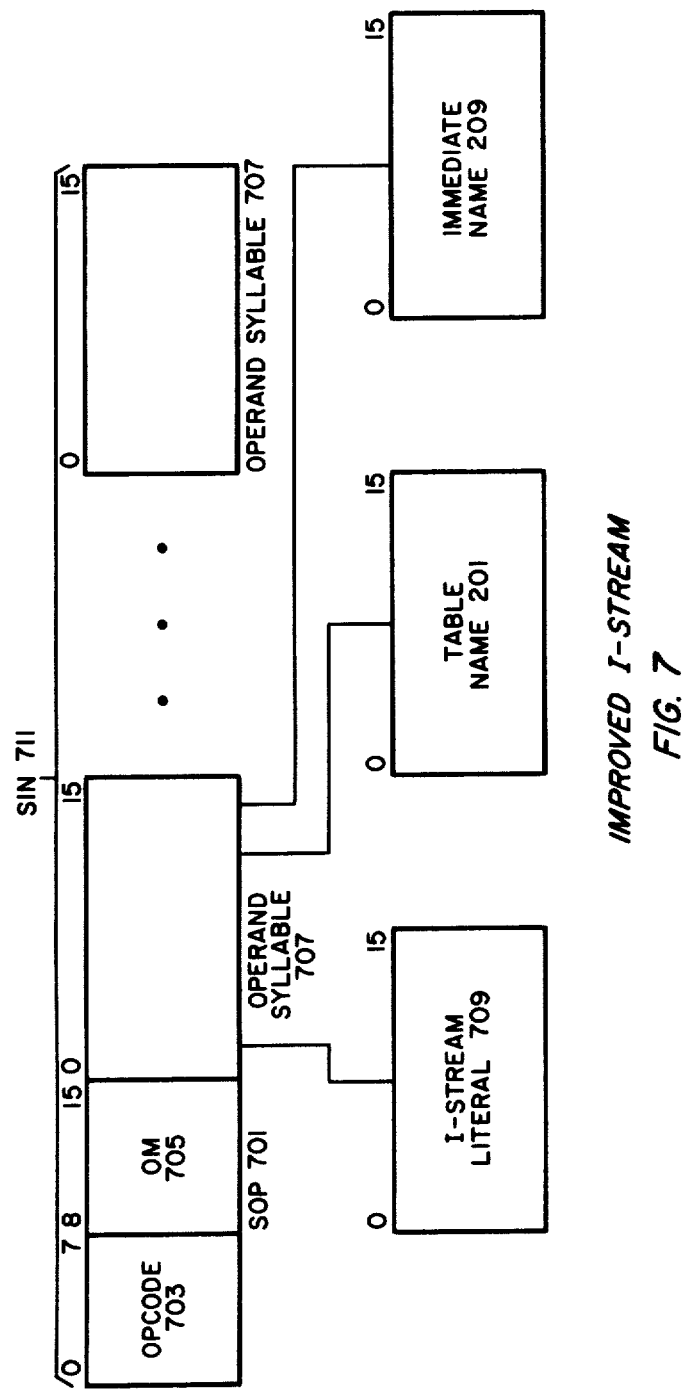
FIG. 7 is a diagram of the improved instruction stream of the present invention.

To overcome these problems, the present invention has made the SOP and all operand syllables 16 bits long. FIG. 7 illustrates the improved I-stream of the present invention. FIG. 7 represents a single SIN 711, consisting ot an SOP 701 and a sequence of Operand Syllables 707. SOP 701 and Operand Syllables 707 are all 16 bits long. An Operand Syllable 707 may be an I-stream Literal 709, a Table Name 201, or an Immediate Name 209. Table Names 201 and Immediate Names 209 have already been described in detail; I-stream Literal 709 is a 16-bit signed integer value.

SOP 701 contains two eight-bit fields. Opcode Field 703 contains SOP 701's opcode. In most SINs, the opcode in Opcode Field 703 completely specifies the operation to be performed by JP 10114 when it executes SIN 711. OM Field 705 contains an additional eight-bit value which is used in the execution of the operation specified by Opcode Field 703. The value in OM Field 705 may have one of three functions, depending on SIN 711:

In SINs 711 specifying branches (i.e., non-sequential transfers of control from one SIN 711 to another within a Procedure 00602), OM Field 705 may contain a signed literal value specifying the location relative to the branch SIN 711's SOP 701 of the next SIN 711 to be executed.

In SINs 711 specifying Calls to other Procedures 00602, OM Field 705 contains a value specifying the number of arguments used in the Call.

In certain other SOPs, the value in OM Field is a secondary opcode. In these SOPs, Opcode Field 703 and OM Field 705 together form a single 16-bit opcode.

In the branch SINs of CS 10110, the literal value specifying the location of the next SIN to be executed is contained in a Literal Syllable following the SOP, and this Syllable had to be fetched and parsed before the SOP could perform the branch. One of the chief uses of branch SOPs is in loops, and since most of the execution time of many programs is spent executing loops, the additional overhead required to fetch the literal syllable has an adverse effect on performance. In the present invention, the S-interpreter microcode executing a branch SIN 711 checks the value of OM Field 705; if OM Field 705's value is not equal to 0, the S-interpreter microcode multiplies OM Field 705's value by 16 and adds it to the current value of IPC 20272 to obtain the location of the next SIN 711. Otherwise, the S-interpreter microcode causes the next Operand Syllable 707 to be parsed. This Operand Syllable contains a 16-bit literal value, and the S-interpreter microcode multiplies that value by 16 and adds it to IPC 20272 as described above. Since OM Field 705's values may range from −255 to +255, it can specify branches to SINs 711 located within 255 16-bit syllables of the Branch SOP 701. Loops executed with very high frequency tend to have branches within this range of values, and consequently, the use of OM Field 705 for the literal value significantly increases the speed with which programs execute on the present invention.

Like branches, Calls are frequently-performed operations. In the Call SINs 711 of CS 10110, the number of arguments in the Call is specified by a literal operand syllable, and this syllable has to be fetched as part of every Call operation. Furthermore, since Procedures 00602 typically have only 2 or three arguments and virtually never take more than 10, the 8, 12, or 16 bits of the literal value were far more than required to specify the number of arguments. In the present invention, the number of arguments is specified by OM Field 705 and an I-stream Literal 709 is therefore no longer required in Call SINs 711 of the present invention. Since the number of arguments is always positive, OM Field 705 can specify up to 511 arguments, far more than required for any practical Procedure 00602.

In certain SINs 711 which are infrequently used or whose execution is generally of long duration, OM Field 705 is used as a secondary opcode. JP 10114 obtains the primary opcode from Opcode Field 703 and then, as specified by that opcode, obtains a secondary opcode from OM Field 705. The primary and secondary opcodes together define the operation. OM Field 705 is not so used in SINs 711 which are frequently used or may be quickly executed because of the additional time required to evaluate OM Field 705.

The intrinsic functions defined by the FORTRAN language provide an example of the use of OM Field 705 as a secondary opcode. These intrinsic functions perform complex mathematical operations such as the calculation of trigonometric functions and square roots. The time required to perform such operations is generally much greater than the time required to perform simple arithmetic operations, and the extra time required for the evaluation of OM Field 705 is insignificant compared with the time required to perform the intrinsic operation itself. Consequently, all SOPs specifying FORTRAN intrinsic operations have a primary opcode of decimal 14 in Opcode Field 703 and the value of OM Field 705 specifies the specific intrinsic operation. For example, in the GCOS SOP for the cosine operation, OM Field 705 has the value decimal 4, and in the GSIN SOP for the sine operation, OM Field 705 has the value decimal 11.

In the present invention, the exclusive use of 16-bit Operand Syllables 707 has another advantage: as described above, Immediate Names 209 require four bits for NTY Field 203, IB Field 205, and the reserved bit following IB Field 205. If Operand Syllables 707 could have lengths of 8, 12, or 16 bits, as in CS 10110, some Immediate Names 209 would have 32_DISP Fields 211 containing 4 bits and other would have 32_DISP Fields 211 containing 8 bits. The small range of displacement values possible in 4 or 8-bit 32_DISP Fields 211 would greatly reduce the utility or Immediate Names 209 in the present invention.

As may be seen from the above description, the improved I-stream of the present invention has five main advantages over the I-stream of CS 10110:

The exclusive use of 16-bit syllables simplifies parsing, thus reducing hardware costs for the machine.

There is no longer any need to save and restore a value specifying syllable size on Calls and Returns and when a Virtual Processor 00612 ceases and resumes execution on JP 18114.

The addition of OM Field 705 to the SOP syllable allows the elimination of I-stream Literals from certain frequently-executed SINs 711, thereby speeding the execution of these SINs 711.

The use of OM Field 705 for secondary opcodes allows longer opcodes for infrequent operations or operations of long duration without reducing the speed of other operations.

16-bit Names allow the extensive use of Immediate Names 209 and therefore speed up Name Resolution and reduce the size of Name Table 305 as previously described.

Taken together, these advantages allow significant cost reductions and performance improvements in computer systems of the present invention.

2. Implementation of the 16-bit I-stream in the Present Embodiment

The present embodiment still employs the parsing hardware of CS 10110. The hardware itself is described in Chapter 2.B.3.b.b.a.a.a, of U.S. patent application Ser. No. 266,539, and the microcommands which control the hardware in Chapter 3.B.3.h.h. In the present embodiment, parsing microcode modifies the behavior of the parsing hardware so that it correctly parses the I-stream of the present invention. On beginning the execution of a SIN 711, parsing microcode uses the parse_op_stage microcommand in CS 10110 to fetch Opcode Field 703. Then it sets CSSR 24112, which contained the syllable size, K, in CS 10110, to 8 and uses the parse_k_load_epc command to fetch OM Field 705 and place its value on NAME 20224. Finally, it sets CSSR 24112 to 16 and fetches the SIN's Operand Syllables 707. In other embodiments, CSSR 24112 may be omitted and the parsing hardware may always fetch 16-bit syllables. The microcode which performs the above operations is contained in EMULATE_2400.

D. Accumulator SOPs

Each instruction which may be executed on a digital computer system may be said to specify a machine upon which the operation indicated by the instruction is executed. For example, an ADD instruction on a typical traditional digital computer system specifies two registers which contain the value to be added, an ALU to perform the operation, and a third register to hold the result. These three registers and the ALU are the "machine" with which the addition operation is performed.

Taken together, the set of instructions which may be executed on a digital computer system specifies a conceptual machine consisting of all of the "machine" specified by the individual instructions. This conceptual machine is termed the digital computer system's architecture. If two digital computer systems have the same architecture, they will execute the same instructions in the same manner, regardless of any differences in the physical devices making up the digital computer systems.

1. Traditional Architectures

The conceptual machines specified by instruction sets for instructions for traditional digital computer systems of the prior art typically specify operations in terms of registers and operations performed by an ALU on the contents of those registers. Thus, the kind of operations typically specified by statements in high-level languages such as FORTRAN must be carried out by a sequence of several instructions. The following FORTRAN fragment can provide an example of this relationship between high-level language statements and instructions in traditional digital computer systems.

REAL SUM, VALA, VALB

...

SUM = VALA + VALB

The instructions corresponding to the statement
SUM = VALA + VALB
typically include the following:

(1) a first load instruction which loads the value at the location specified by VALA from memory into a first register.
(2) a second load instruction which loads the value at the location specified by VALB into a second register.
(3) a floating point add arithmetic instruction which specifies the first and second registers as sources for an ALU which performs floating point arithmetic. Output from the ALU goes to a result register.
(4) a store instruction which stores the contents of the result register at the location specifed by SUM.

In many cases, further instructions preceding the above instructions may be required to set up addressing registers so that they specify the locations of the variables.

2. SIN Architecture of CS 10110

Figure 8:
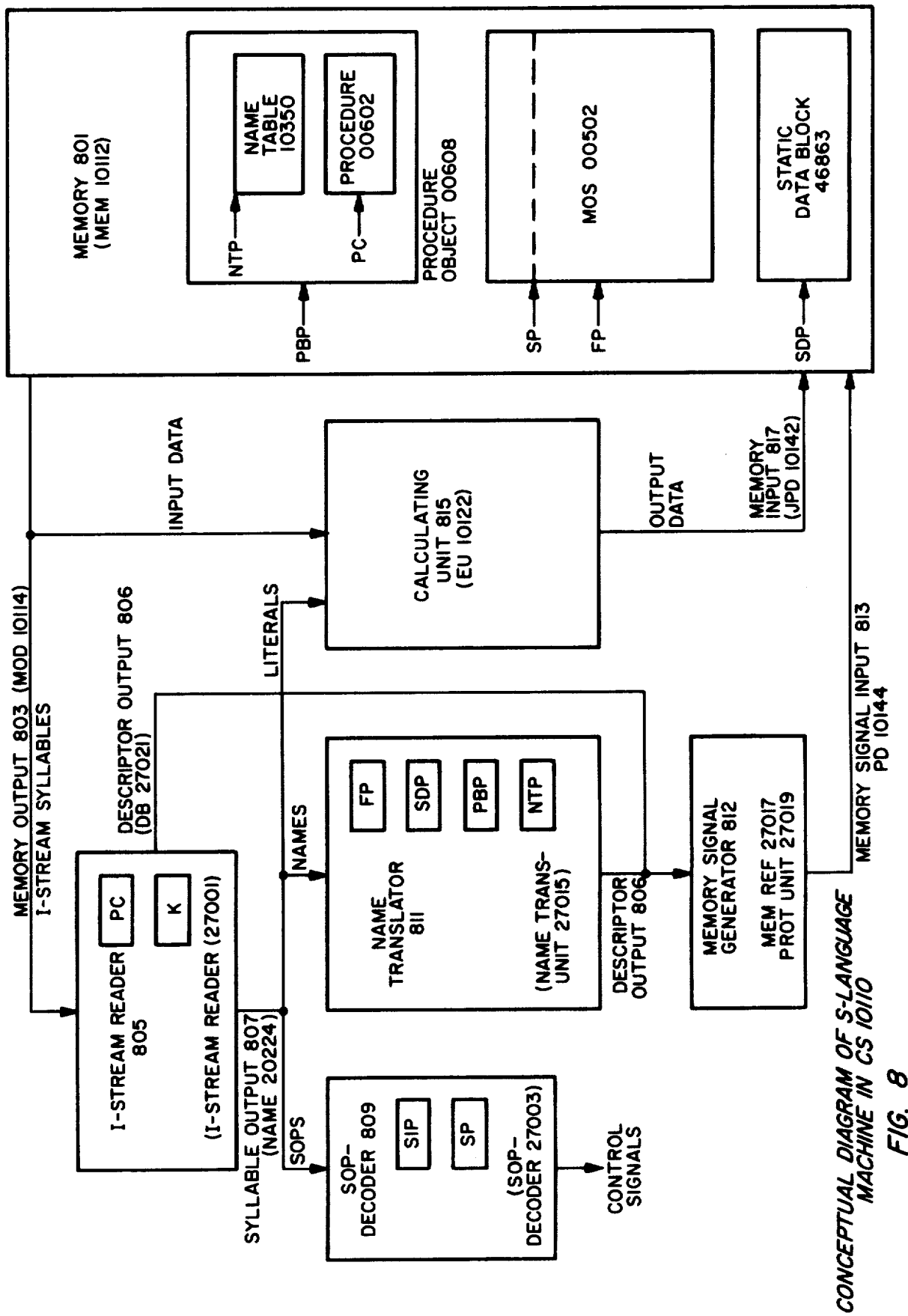
FIG. 8 is a conceptual diagram of the S-language machine in CS 10110 of the original digital data processing system.

The conceptual machine required to execute the SINS of CS 10110 described in U.S. patent application Ser. No. 266,539, is represented in FIG. 8. In orcer to establish the relationship between the conceptual machine and the devices in CS 10110 which actually perform the operations specified by the SINs, there is listed with each conceptual device the corresponding devices from FIG. 270 of U.S. patent application Ser. No. 266,539.

The devices of the conceptual machine of FIG. 8 include:

Memory 801 (MEM 10112), in which data and Procedure Objects 00608 are stored. Procedure Objects 00608 contain Procedures 00602, containing sequences of SINs, and Name Tables 10350, containing NTEs for the Names in the SINs of Procedures 00602. When a Procedure 00602 is being executed, it uses data contained in a stack, MOS 00502, and a Static Data Block 46863. A Procedure 00602 may also use other data in Memory 801.

Memory Output 803 (MOD 10114), which transmits data from Memory 801 to Calculating Unit 815 and SINs from Memory 801 to I-stream Reader 805.

I-stream Reader 805 (I-Stream Reader 27001), which parses SINs obtained from Memory 801 into SOPs, Names, and Literal Syllables. The syllables are output on Syllable Output 807. In addition, I-stream reader generates descriptors specifying the locations of syllables in Memory 801. These descriptors are output onto Descriptor Output 806 (DB 27021). I-stream Reader 805 further contains two registers whose values are used to generate descriptors: PC, specifying the address of the next SIN to be fetched in Procedure 00602 being executed, and K, specifying the syllable size of Operand Syllables in Procedure 00602.

Syllable Output 807 (NAME 20224), which delivers syllables parsed from the I-stream by I-stream Reader 805 to SOP Decoder 809, Name Translator 811, and Calculating Unit 815.

SOP Decoder 809 (SOP Decoder 27003), which decodes SOPs obtained from Syllable Output 807 and produces control signals to which the devices of the conceptual machine of FIG. 8 respond. SOP Decoder 809 also contains an SIP register containing a value which specifies the S-interpreter being used to decode the SOPs.

Name Translator 811 (Name Trans. Unit 27015), which resolves and evaluates Names obtained from Syllable Output 807 and produces descriptors (Logical Descriptors 27116) which it outputs to Descriptor Output 806. Name Translator 811 contains four registers: three contain the ABPs: FP, specifying the location in MOS 00502 of the frame for the current execution of Procedure 00602, SDP, specifying the location of Static Data Block 46863 being used for the current execution of Procedure 00602, and PBP, specifying a location in Procedure Object 00608 containing Procedure 00602. The fourth contains NTP, specifying the location of Name Table 10350 for Procedure 00602 in Procedure Object 00608.

Memory Signal Generator 812 (Memory Ref. Unit 27017, Prot. Unit 27019) takes descriptors from Descriptor Output 806 and produces memory signals containing addresses and indicating read, write, and execute operations. Memory Signal Input 813 (PD 10146) carries these signals to Memory 801.

Calculating Unit 815 (EU 10122), finally, receives data from Memory 801 via Memory Output 803 and I-stream Literals from I-stream Reader 805 via Syllable Output 807. It processes its inputs as specified by the SOP and outputs the result to Memory Input 817 and thereby to Memory 801.

Unlike the conceptual machines specified by instructions of the traditional digital data processing system, conceptual machine of FIG. 8 contains no general-purpose registers. The contents of the registers specified in FIG. 8 may be changed only by certain SINs, and only in narrowly-defined ways. Beginning with the PC register in I-stream Reader 805, only Branch SINs and Call and Return SINs may explicitly set the PC register to a new value. All other SINs merely implicitly increment the PC register to specify the next SIN.

The registers K in I-stream Reader 805, SIP in SOP Decoder 809, and FP, SDP, PBP, and NTP in Name Translator 811, may only be set to new values by Call and Return SINs. The Call SIN saves the current values of K, SIP, FP, SDP, PBP and NTP on the frame in MOS 00502 for the execution of Procedure 00602 executing the Call SIN and then sets these registers to the new values required for Procedure 00602 being called. The Return SIN sets these registers to the values saved on the frame in MOS 00502 for the execution of Procedure 00602 to which the Return SIN returns.

The operations performed by the conceptual machine defined by CS 10110 corresponds closely to the operations specified by statements in high-level languages. Generally, therefore, few SINs are generally needed to carry out the operations specified by such a statement. For example, in CS 10110, the FORTRAN statement of the above example corresponds to a single FORTRAN SIN, specified as follows:

FADD n1, n2, n3

FADD indicates the opcode, in this case, 60, and n1, n2, and n3 indicate three Names. The operation specified for FADD is the addition of evaluated n1 to evaluated n2 and the storage of the result at resolved n3.

The operation is executed on the conceptual machine of FIG. 8 as follows: using the PC register, I-stream Reader 805 generates a descriptor for FADD's SOP. The descriptor is delivered via Descriptor Output 806 to Memory Signal Generator 812, which forms a memory signal from it. The memory signal is delivered via Memory Signal Input 813 to Memory 801. Memory 801 then outputs the SOP onto Memory Output 803 and I-stream Reader 805 parses the SOP and delivers it to SOP Decoder 809. SOP Decoder 809 decodes it to produce control signals directing further operations. In response to these control signals, I stream Reader 805 obtains the next syllable, i.e., the Name representing VALA as described for the SOP, and delivers the Name via Syllable Output 807 to Name Translator 811. Name Translator 811 resolves the Name to produce a descriptor specifying the location, length, and type of VALA, and outputs the descriptor to Descriptor Output 806. Memory Signal Generator 812 receives the descriptor from Descriptor Output 806, and since the SOP specifies an Evaluation operation, outputs a signal on Memory Signal Output 813 specifying that the value at the location of VALA is to be delivered via Memory Output 803 to Calculating Unit 815. The operation described for VALA's Name is repeated with the Name representing VALB, and Calculating Unit 815 begins calculating VALA+VALB. Meanwhile, Name Translator 811 resolves the Name representing SUM and passes the descriptor for SUM to Memory Signal Generator 813, which produces a signal on Memory Signal Output 813 specifying that the value on Memory Input 817 is to be stored at the location specified in the memory signal. When Calculating Unit 815 is finished with the calculation, the result is output onto Memory Input 817 and stored at the location obtained by resolving n3. Finally, the PC register in I-stream Reader 805 is set to specify the location of the next SIN, and the execution of that SIN proceeds essentially as just described.

It is noteworthy here that the transfers specified by FADD are from Memory 801 to Calculating Unit 815 and then back to Memory 801, not from memory to a register and from a register to memory, as in the conceptual machines of traditional digital computer systems. Of course, the actual operation in CS 10110 does involve registers in FU 10120 and EU 10122, but the manner in which these registers are manipulated cannot be specified in the FADD SIN, and are thus not part of the "machine" described by the FADD SIN.

The advantages of the conceptual machine described by the SINs of CS 101110 for executing programs written in high-level languages are obvious when one compares the single FADD SIN used to execute the FORTRAN statement of the example with the sequence of instructions required to execute the statement in typical traditional digital computer systems. However, there is one respect in which the fact that instructions in traditional digital computer systems may specify registers is advantageous: if the result of one operation is required as input to the next operation, instructions in traditional digital computer systems can specify the register containing the results as a source of the input for the next operation. The advantages stemming from this capability can be seen by considering the FORTRAN statement

SUM=SUM+VALA+VALB

The execution of this statement in a traditional digital computer system of the prior art requires only two instructions more than the execution of the first example statement:

(1) A third load instruction which loads SUM into a register. The register may be one of those which contained VALA or VALB.

(2) An additional integer add arithmetic instruction which specifies the register containing SUM and the result register as sources for the ALU.

In CS 10110, SINs may only specify data in Memory 801, and consequently, the result must be stored in Memory 801 at the end of the first operation and retrieved from Memory 801 at the beginning of the next. The FORTRAN statement

SUM=SUM+VALA+VALB therefore requires two FADD SINs, one specifying Names for VALA, VALB, and a location in Memory 801 for the temporary storage of the result, and a second specifying the temporary location and SUM as the sources of the values to be added and SUM as the location at which the result is to be stored. The requirement in CS 10110 that the values operated on in SOPs must always come from Memory 801 and that the results be returned to Memory 801 has the following consefuences:

(1) The compiler must frequently specify areas in Memory 801 to hold intermediate results and create Names and NTEs specifying these areas.

(2) SINs must always contain Names specifying sources and destinations of data. These Names increase the size of the SINs and their resolution and evaluation increases execution time.

(3) The need for extra Names and NTEs to specify storage for intermediate results increases the size of Procedures 00602 and Name Tables 10350.

(4)The need to store the result in Memory 801 at the end of one SIN and fetch it from Memory 801 at the beginning of the next slows the execution of the SIN.

3. SOPs Specifying an Accumulator

Figure 9:
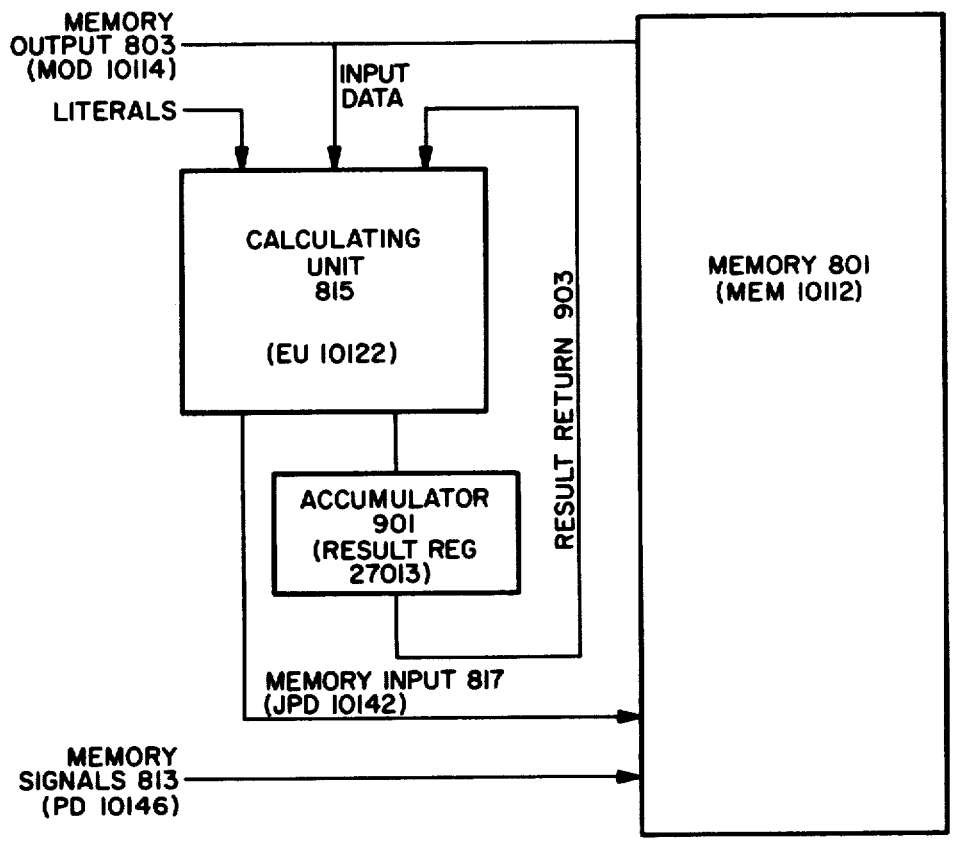
FIG. 9 is a conceptual diagram of the Calculating Unit and Accumulator in the improved S-language machine of the present invention.

The present invention improves the digital data system of U.S. patent application Ser. No. 266,539 by adding an accumulator. FIG. 9 illustrates this change. The conceptual machine of the present invention in general resembles that of CS 10110, but has an additional register, Accumulator 901. The results of any operation performed by Calculating Unit 815 are retained in Accumulator 901. Thus, in the present invention, all SOPs specifying operations performed by Calculating Unit 815 implicitly specify Accumulator 901 as a destination for the result of an operation. In addition, an SOP may specify a location in MEM 801 as a destination for the result of an operation and Accumulator 901 as a source for a value to be operated on. These new possibilities in the present invention are indicated by Calculating Unit 815's inputs and outputs in FIG. 9. Calculating Unit 815 is represented with two outputs instead of the single output of CS 10110. One output is connected to Accumulator 901 and the other to Memory Input 817, indicating that Calculating Unit 815 can output results to both Accumulator 901 and Memory 801. Calculating Unit 815 is further represented with three inputs instead of the two inputs of FIG. 8. The additional input, Result Return 903, is connected to Accumulator 901, indicating that Accumulator 901 may be used as a source of data for Calculating Unit 815.

Accumulator 901 of the present invention is a special-purpose register. It may contain only the results of a Calculating Unit 815 operation, is loaded only as a consequence of a Calculating Unit 815 operation, and may serve as a source of data only for Calculating Unit 815. In particular, unlike the general-purpose registers of traditional digital computer systems, Accumulator 901 cannot be loaded from Memory 801 and Accumulator 901's contents cannot be output to Memory 801.

Since SINs in the present invention may specify Accumulator 901 as a source for Calculating Unit 815, operations that were specified by certain single SINs in CS 10110 are now specified by one of a group of SINs. For example, in the present invention, there are six variants of the FADD SIN:

(1) FADD n1, n2, n3: This SIN is like the FADD of CS 10110, except that the result is retained in Accumulator 901 in addition to being stored in Memory 801 at the location obtained by resolving n3.

(2) FADD.A n1, n2: This SIN adds operands obtained by evaluating n1 and n2 and retains the result in Accumulator 901. It does not store the result in Memory 801, and thus, no third name is necessary.

(3) FADD.M n1, n2: This SIN adds the operand obtained by evaluating n1 to the contents of Accumulator 901. The result is retained in Accumulator 901 and is also stored in Memory 801 at the location obtained by resolving n2.

(4) FADD2 n1, n2: This SIN adds operands obtained by evaluating n1 and n2, retains the result in Accumulator 901, and also stores the result in the location in Memory 801 obtained from the resolution of n2.

(5) FADD2.A n1: This SIN evaluates n1, adds the result to the contents of Accumulator 901, and retains the result in Accumulator 901.

(6) FADD2.M n1: This SIN evaluates n1, adds the result to the contents of Accumulator 901, retains the result in Accumulator 901, and also stores the result in the location in Memory 801 obtained from the resolution of n1.

The advantages obtained in the present invention by the use of a family of SINs in place of the single SIN of CS 10110 may be seen by comparing the manner in which CS 10110 and the present invention deal with the following FORTRAN example:

REAL X, Y, Z, A, B, C
. . .
A = B + C
X = A + Y + Z

In CS 10110 as described in U.S. patent application Ser. No. 266,539, all of the operations specified in the two statements of the above fragment would have been performed by FADD SINs. In the second statement, a location in Memory 801 would have been required to hold the result of Y+Z, and consequently, the compiler would have had to generate Names and NTEs not only for X, Y, Z, A, B, and C, but also for the temporary, which we will call TEMP. Using the names of the variables for the Names in the SINs which represent them, the SINs in CS 10110 required for the two statements in the fragment are the following:

FADD B,C,A
(Evaluate B, evaluate C, resolve A, do A+B, and store the result in A)
FADD A, Y, TEMP
(Evaluate A, Evaluate Y, resolve TEMP, do A+Y, and store the result in TEMP)
FADD Z, TEMP, X
(Evaluate Z, Evaluate TEMP, resolve X, do X+TEMP, and store the result in X)

Each of the above SINs contains 4 syllables, and thus 12 syllables must be fetched to perform the specified operation. Each of the SINs further specifies that 2 data items be fetched from Memory 801 to Calculating Unit 815 and 1 data item be written from Calculating Unit 815 to Memory 801. Consequently, 9 memory operations are required for the data. Furthermore, in executing the above SINs, CS 10110 of U.S. patent application Ser. No. 266,539 performs six Name Evaluation operations and three Name Resolution operations. Each of these operations requires information from Name Table 10350 and Name Table 10350 must have a NTE for each variable and for TEMP. Finally, storage must be provided in Memory 801 for the intermediate results.

In the present invention, the FORTRAN statements in the fragment are executed by the following three SINs:

FADD B, C, A
(Evaluate B, evaluate C, resolve A, do B+C, retain the result in Accumulator 901, and store the result to A)
FADD2.A Y
(Evaluate Y, add Y to the contents of Accumulator 901, and retain the result in Accumulator 901)
FADD.M Z, X
(Evaluate Z, resolve X, add Z to the contents of Accumulator 901, retain the result in Accumulator 901, and store the result to X)

Thus, in the present invention, the SINs contain 9 instead of 12 syllables, there are 6 instead of 9 fetches of data from Memory 801 or stores of data to Memory 801, 6 instead of 9 Name Resolution or Evaluation operations, no space is required in Memory 801 for storing intermediate results, and no Name is needed to refer to storage for intermediate results. Furthermore, if X, Y, Z, A, B, and C are local or static data, and may therefore be located by offsets from FP or SDP, their Names will be Immediate Names 209 in the present invention, there will be no NTEs 307 for the Names, and the Name Resolution and Evaluation operations can proceed without reference to information in Name Table 305.

4. Implementation of Accumulator 901

In the present embodiment of the present invention, Accumulator 901, Memory Input 817, and Result Return 903 are implemented by means of Result Reg 27013 of EU 10122, JPD Bus 10142, and data paths internal to EU 10122 which allow the results of one EU 10122 operation to be used as an operand for another EU 10122 operation respectively. The relationship between JPD Bus 10142, Result Reg 27013, and MEM 10112 may be seen in FIG. 270 of U.S. patent application Ser. No. 266,539 the data paths internal to EU 10122 may be seen in FIGS. 256 and 257 of U.S. patent application Ser. No. 266,539. Transfer of data from Result Reg 27013 to MEM 10122 via JPD Bus 10142 is under control of FU 10120 microcode, and the use of data from Result Reg 27013 as an operand in EU 10122 is under control of EU 10122 microcode. Thus, it was physically possible in CS 10110 as described in U.S. patent application Ser. No. 266,539 to retain results of an operation in Result Reg 27013 while writing it to MEM 10112 and to then use the contents of Result Reg 27013 as an operand for EU 10122, but the SINs available in CS 10110 did not specify such operations. The SINs of the present invention, however, can specify Accumulator 901 as described above, and all that is required to implement them is new opcodes and FU 10120 and EU 10122 microcode responsive to these new opcodes. Examples of such microcode are provided in CSL.DISP_2 and ACCUMULATION_ENTRIES.

E. Call SINs and the Return SIN

In both CS 10110 of U.S. patent application Ser. No. 266,539 and the present invention, the execution of a Call SIN suspends the execution of the Procedure 00602 containing the Call SIN (the calling Procedure 00602) at the point of the Call SIN and commences an execution of another Procedure 00602 (the called Procedure 00602) specified in the Call SIN. While a called Procedure 00602 is executing, it may use data from calling Procedure 00602. Such data is called arguments, and the Call SIN specifies which data is to be used for a given execution of called Procedure 00602. The execution of a Return SIN terminates an execution of called Procedure 00602 containing the Return SIN and resumes the execution of calling Procedure 00602 whose execution was suspended by execution of the Call SIN. In terms of the Conceptual Machine of FIG. 8, the Call SIN sets registers PC, K, SIP, SP, FP, SDP, PBP, and NTP of FIG. 8 to values appropriate for called Procedure 00602 and the Return SIN resets those registers to the values they had at the time of the execution of the Call SIN. As may be seen from the above, a Call SIN must do five things:

It must save the contents of the registers of the conceptual S-language machine.

It must provide means by which called Procedure 00602 can locate the data used as arguments in the Call SIN.

It must locate called Procedure 00602.

It set the registers of the conceptual S-language machine to the values required for the execution of called Procedure 00602.

It must allocate storage in Memory 801 for the execution of called Procedure 00602.

It must begin execution of called Procedure 00602.

The Return SIN must do two things:

It must locate the register values for calling Procedure 00602 saved by the Call SIN.

It must set the registers in the conceptual S-language machine from these values.

In CS 10110 and the present invention, the Call SINs employ a Macro Stack (MAS) 00502 to save the register values for calling Procedure 00602, to provide called Procedure 00602 with access to the arguments specified in the Call SIN, and to provide the memory space required for called Procedure 00602's execution. MAS 00502 is made up of frames. Each frame contains state for an execution of a Procedure 00602. The topmost frame in MAS 00502 is that of Procedure 00602 currently being executed; the preceding frame in MAS 00502 is that of Procedure 00602 which was the caller of Procedure 00602 currently being executed, the frame preceding that frame is that of the caller of the caller, and so on. When a Call SIN is executed, it creates a new frame for called Procedure 00602 at the top of MAS 00502, and when a Return SIN is executed, it makes the preceding frame, which is that belonging to calling Procedure 00602 which called Procedure 00602 in which the Return SIN was executed, into the top frame of MAS 00502. While all Calls in CS 10110 and the present invention function logically as described above, certain characteristics of CS 10110 and the present invention make the execution of certain Call SINs much more complex that the execution of other Call SINs. The first of these characteristics is that more state must be changed in some Call SINs than in others. In CS 10110 and the present invention, a Procedure 00602 has associated with it a Procedure Environment Descriptor (PED). A Procedure 00602's PED contains the following:

NTP, A pointer to Name Table 10350 which contains NTEs for Procedure 00602's Names.

SIP, an identifier for the S-interpreter required to execute Procedure 00602's SOPs.

SDPP, a pointer which may be resolved to obtain the location of static data used by an execution of Procedure 00602.

PBP, a pointer to a location used as a base from which to calculate locations in Procedure 00602.

On a call, the SIP register in the conceptual S-language machine is set from SIP, the SDP register is set from a pointer obtained by resolving the pointer in SDPP, and the PBP register is set from PBP.

If a calling Procedure 00602 and a called Procedure 00602 share a PED, the call need not change the values contained in the SIP, SDP, and PBP registers. All that is required is that FP and SP be set to specify the proper locations in called Procedure 00602's frame and PC be set to the location of the first of called Procedure 00602's SINs. When calling Procedure 00602 and called Procedure 00602 do not share a PED, called Procedure 00602's PED must be located and the SIP, SDP, and PBP registers must be set to values obtained from the PED. The amount of time required to execute a Return SIN is similarly dependent upon the number of conceptual S-language machine registers which must be reset. The second of these characteristics is the access control system of CS 10110 and the present invention. As explained in detail in 4.C of U.S. patent application. Ser. No. 266,539, in CS 10110 and the present invention, Procedures 00602 are executed by entities called Subjects. A Procedure 00602 may access data only if an Access Control List associated with the object containing the data allows the Subject executing Procedure 00602 to have the kind of access to the data in the object required to perform the operation specified by the SIN in Procedure 00602 currently being executed. Each Procedure Object 00608 has associated with it a Domain of Execution attribute. When a Subject is executing a Procedure 00602 contained in that Procedure Object 00602, the Domain of Execution attribute is one component of the Subject. Thus, when a Call SIN invokes a Procedure 00602 contained in a Procedure Object 00608 with a different Domain of Execution attribute from that possessed by calling Procedure 00602's Procedure Object 00608, the Subject executing called Procedure 00602 changes. Such a Call is termed a Cross-domain Call. Because a Cross-domain Call changes the Subject, the Called Procedure 00602 has no access to MAS Object (MASO) 46703 containing calling Procedure 00602's stack frame and the stack frame for called Procedure 00602 must be constructed in a MASO 46703 to which the new Subject has access. In order to construct the stack frame, the Call SIN must locate MASO 46703 for the new stack frame and copy state from MASO 46703 containing calling Procedure 00602's stack frame over to MASO 46703 containing the new stack frame. On a return from such a Call, the subject similarly changes and the Return SIN must locate MASO 46703 containing calling Procedure 00602's stack frame. The change of the Subject and the transitions from one object to another and back in Cross-domain Call are handled by KOS microcode components. The state required to locate the proper MASO 46703 is stored on a separate stack accessible only to KOS. This stack is contained in SS Object 10336.

1. Calls and Returns in CS 10110

Call and Return in CS 10110 is described in detail in Section 4.E.d of U.S. patent application Ser. No. 266,539. In CS 10110, SS Object 10336 and two Call SINs were used to deal with the differing degrees of state manipulation required in Call and Return operations. The two SINs were the Mediated Call SIN and the Neighborhood Call SIN. Mediated Call SINs were used for Calls involving Procedures 00602 which did not share PEDs; consequently, Mediated Call Sins set PC, K, SIP, SP, FP, SDP, PBP, and NTP in the conceptual S-language machine. Neighborhood Call SINs were used for Calls involving Procedures 00602 which did share PEDs; consequently, Neighborhood Call SINs set only PC, SP, and FP. However, this optimization was not possible with regard to the Return SIN. It was possible for a given Procedure 00602 to be called by both Mediated Call SINs and Neighborhood Call SINs, and the Return SIN therefore had to determine which Call SIN had called Procedure 00602 and in the case of the Mediated Call SIN, whether the Return SIN had to locate a new PED, a new Procedure Object 00608, or a new stack. The Mediated Call SIN stored this information in SS Object 10336 and the Return SIN examined this information to determine what actions it had to perform. Consequently, SS Object 10336 was involved in all Mediated Calls and in all Returns.

2. Calls and Returns in the Present Invention

In the present invention, there are one Mediated Call SIN and two Neighborhood Call SINs. The Mediated Call SIN is called GCALL. For the present discussion, it may be specified as follows:

GCALL n1, [n2, n3, ... nm]

SOP 701 for the GCALL SIN contains the opcode and, in OM Field 705, the number of arguments. The first Operand Syllable 707 is a Name specifying Procedure 00602 being called; when the Name is evaluated, it yields a pointer specifying information from which called Procedure 00602 may be located. The remaining Names specify arguments used in the Call. Resolution of these Names and descriptor-to-pointer conversion yields pointers to the arguments. Since all Operand Syllables 707 have 16 bits, GCALL does not set the K register of the conceptual S-language machine; otherwise, like Mediated Call, it sets PC, SIP, SP, FP, SDP, PBP, and NTP.

The Neighborhood Call SIN may be specified for the present discussion like this:

NCALL litl, [n2, n3, ... nm]

SOP 701 for the NCALL SIN also contains the opcode in Opcode Field 703 and the number of arguments in OM Field 705. The first Operand Syllable 707 is an I-stream Literal 709 which, when multiplied by 16, specifies the offset of called Procedure 0602 from the NCALL SIN. When this value is multiplied by 8 and added to PC, the result is the beginning of called Procedure 00602. The remaining Operand Syllables 707 are Names specifying arguments, as in GCALL.

I-stream Literals 709 are 16 bits long, and therefore cannot specify a Procedure 00602 which is located more than 215-1 bytes from the NCALL SIN. When two Procedures 00602** share a PED but are located too far apart for NCALL, the Neighborhood Call by Name SIN is used. It is specified as follows:

NCALLN n1, [n2, n3, ... nm]

n1 is an Immediate Name 209 or a Table Name 201 which resolves to a location which is a displacement from PBP. The specified location is the beginning of Called Procedures 00602. The remaining Names specify arguments, as in the other Call SINs. Both NCALL and NCALLN set only PC, SP, and FP.

As explained in detail in U.S. patent applicatoin Ser. No. 266,539 4.E.d.7, a call may also result in CS 10110 and the present invention when microcode executing on JP 10114 requires assistance from programs written in high-level languages. In terms of the S-language conceptual machine, microcode to software calls behave like calls made by the GCALL SIN.

As in CS 10110, there is a single Return SIN:
RTN

The RTN SIN has no Operand Syllables 707. The conceptual S language machine registers changed by RTN depends on the number changed in the call.

3. Operation of Call and Return SINs

As described above, the Call and Return SINs use data contained in Procedure Objects and manipulate stack frames. The following discussion first presents Procedure Objects and Stack Frames in the present invention and then discloses the operation of Call and Return SINs with reference to these Procedure Objects and Stack Frames.

a. Procedure Objects 1001

Figure 10:
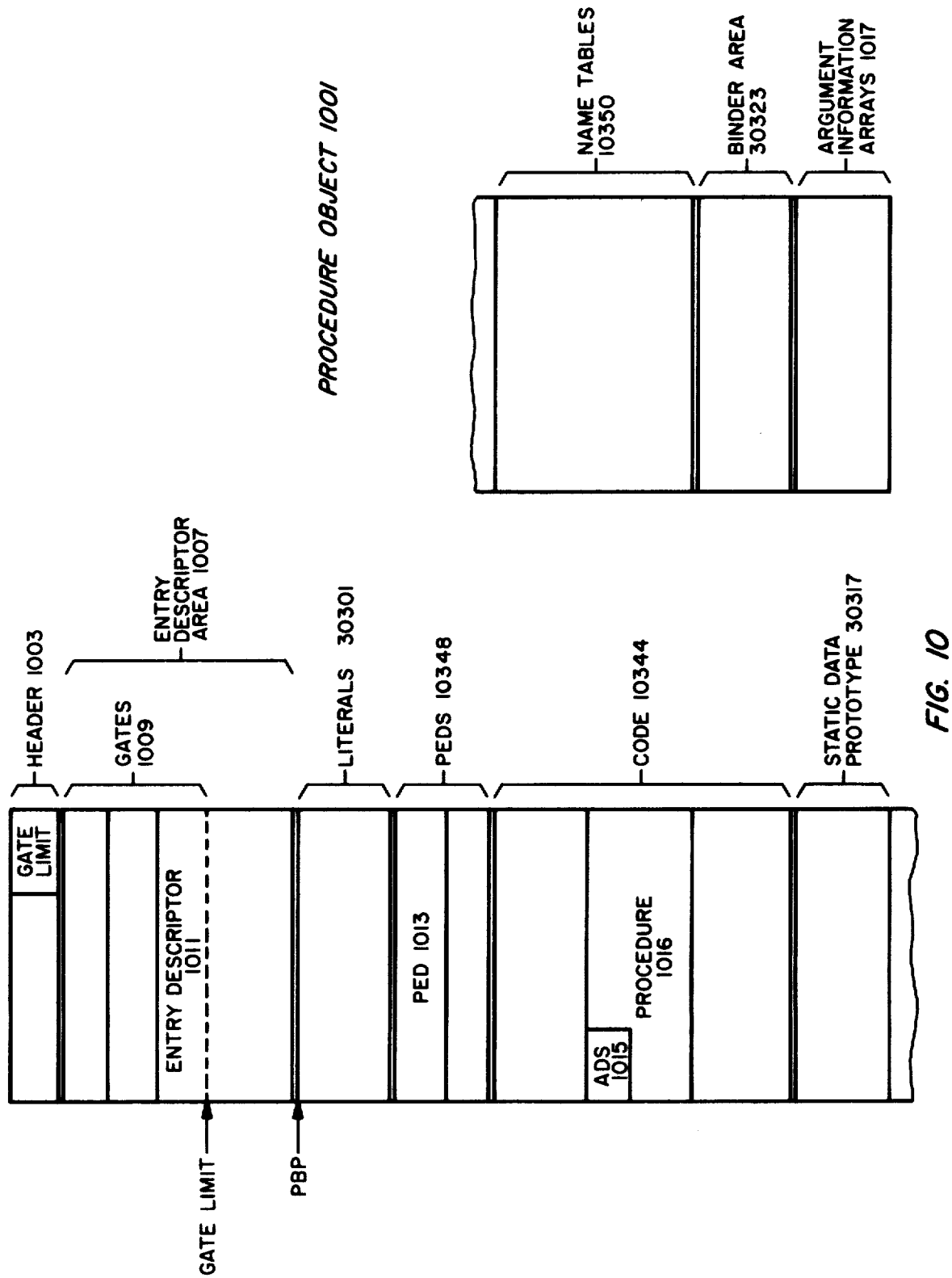
FIG. 10 is a diagram of the procedure object of the present invention.

FIG. 10 presents Procedure Object 1001 of the present invention. FIG. 10 may be compared with FIG. 472 of U.S. patent application Ser. No. 266,539, which shows Procedure Object 00608 of CS 10110. As may be seen from the comparison, Procedure Object 1001 is similar in its basic parts to Procedure Object 00608: both contain Literals 30301, PEDs 10348, Code 10344, Static Data Prototype 30317, Name Tables 10350, and Binder Area 30323. The differences are to be found in Header 1003, Gates 1009, Entry Descriptor AREA 1007, PED 1013, Procedures 1016, and Argument Information Arrays 1017. Header 1003 still contains Gate Limit 47203 specifying the number of Gates 1009 in Procedure Object 1001, but no longer contains AIA Offset 47203 specifying the location of argument information arrays. As will be seen, this information is at other locations in Procedure Object 1001. Entry Descriptor Area 1007 contains Entry Descriptors 1011. These in turn contain information required to locate Procedures 1016. A Gate in Procedure Object 1001 is simply an Entry Descriptor 1009 which is within the number of Entry Descriptors 1011 specified by the value of Gate Limit Field 47203. A calling Procedure 1016 in one Procedure Object 1001 may invoke a called Procedure 1016 in another Procedure Object 1001 only if called Procedure 1016's Entry Descriptor 1011 is in Gates 1009.

The function of PEDs 10348 has already been described; their structure in the present invention will be described later. Code 10344 contains Procedures 1016. These differ from Procedures 00602 in one respect only: the first 16 bits of a Procedure 1016 is ADS Field 1015. ADS Field 1015 contains a 16-bit unsigned value which, when multiplied by 128, specifies the amount of local storage initially required for Procedure l0l6's local data. Argument Information Arrays 1017, finally, are a group of individual Argument Information Arrays rather than a single large Argument Information Array.

Figure 11:
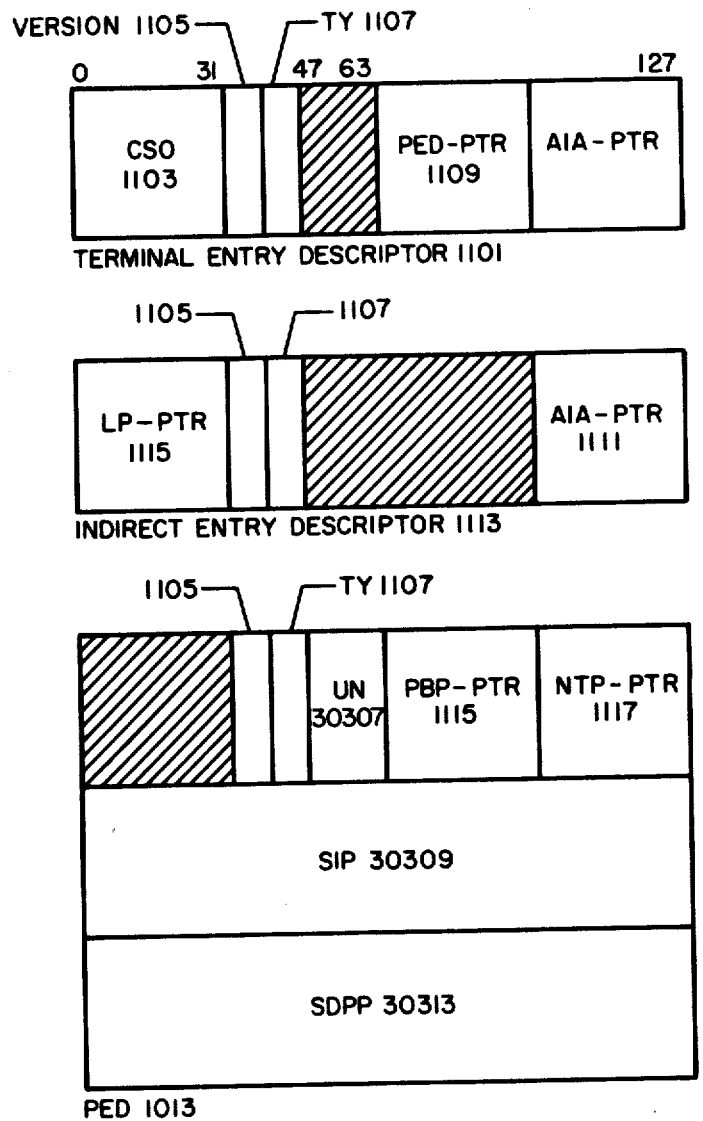
FIG. 11 is a diagram of entry descriptors and procedure environment descriptors of the present invention.

Turning now to FIG. 11, FIG. 11 gives detailed representations of Entry Descriptors 1011 and a PED 1013. There are two kinds of Entry Descriptors 1011: Terminal Entry Descriptors 1101, which contain the information required to locate a Procedure 1016, its PED 1013, and its Argument Information Array 10352, and Indirect Entry Descriptors 1113, which contain a resolved object relative pointer specifying the location of another pointer which in turn specifies the location of another Entry Descriptor 1011. Terminal Entry Descriptor 1101 contains the following fields:

CSO Field 1103: When the value of this Field is added to the base location contained in PBP, the result is the location of Field ADS 1015 of Procedure 1016 specified by Terminal Entry Descriptor 1101.

Version Field 1105 and TY Field 1107 specify the version of Terminal Entry Descriptor 1101 and identify it as a Terminal Entry Descriptor.

PED_PTR 1109 is a resolved ob3ect-relative pointer specifying the location of PED 1013 for Procedure 1016 specified by Terminal Entry Descriptor 1101.

AIA_PTR 1111 is a resolved object-relative pointer specifying the location of an Argument Information Array in Argument Information Arrays 1017 for Procedure 1016. If Procedure 1016 has no Argument Information Array, the pointer is a null pointer.

The fields of Indirect Entry Descriptor 1113 differ from those of Terminal Entry Descriptor 1101 as follows: The first 32 bits contain LP_PTR 1115, a resolved Object Relative pointer specifying the location of a pointer which, when resolved, yields the location of another Entry Descriptor 1011. Version Field 1105 and TY Field 1107 specify the version of Indirect Entry Descriptor 1113 and that Indirect Entry Descriptor 1113 is an Indirect Entry Descriptor. The last 32 bits of Indirect Entry Descriptor 1113 contain AIA_PTR 1111, which has the same function as in Terminal Entry Descriptor 1101.

PED 1013 of the present invention contains information required for the execution of Procedures 00602 sharing PED 1013, and thus has the same function as PED 30303 of CS 10110, described in 3.B.a of U.S. patent application Ser. No. 266,539, but certain fields have been eliminated and others are at different locations. SEPP Field 30316 and K Field 30305 have been eliminated. The latter field specified the syllable size of operand syllables in Procedures 00602 sharing PED 30303, and is thus no longer required in the present invention. The remaining fields are the following:

Version Field and TY Fields 1107 specify the version of PED 1013 and that the data item following TY Field 1107 is a PED 1013.

Three Fields are identical to their equivalents in PED 30303: LN Field 30307 specifies the location of the last NTE in Name Table 305 associated with PED 1013, SIP Field 30309 specifes the S-interpeter used by SINs in Procedures 1016 sharing PED 1013, and SDPP Field 30313 contains a pointer whose resolution yields the location of static data used by an execution of a Procedure 1016 sharing PED 1013.

PBP_PTR Field 1115 contains a resolved object-relative pointer specifying PBP for Procedures 1016 sharing PED 1013.

NTP_PTR Field 1117 contains a resolved object-relative pointer specifying NTP, the beginning of Name Table 305 for Procedures 1016 sharing Ped 1013.

The effects of the changes to Procedure Objects 00608 of CS 10110 in Procedure Objects 1016 may be summarized as follows: First, the addition of ADS Field 1015 makes it possible to allocate local storage for a Procedure 1016 without reference to Procedure 1016's Terminal Entry Descriptor 1101. Second, the AIA for a Procedure 1016 may be located from Terminal Entry Descriptor 1101 instead of from Header 1003. Third, a Procedure 1016's Entry Descriptor 1101 is located at the Gate for that Procedure 1016. The effect of all of these changes is to reduce the number of memory references required to perform a CALL SIN in the present invention.

b. MAS Frame 1201

Figure 12:
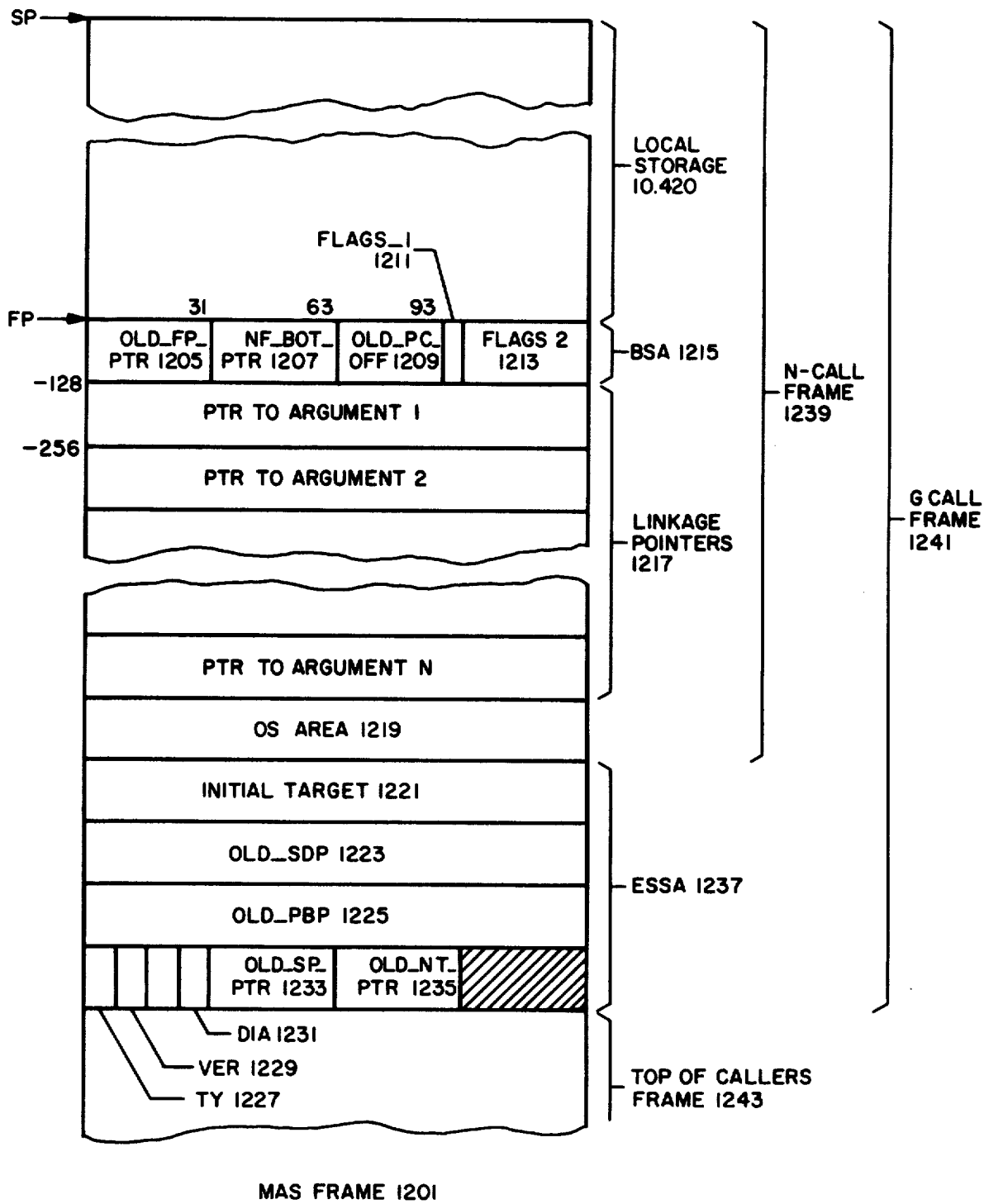
FIG. 12 is a diagram of macrostack frames in the present invention.

In CS 10110 and in the present invention, each execution of a Procedure has associated with it a frame in a MAS Object 46703. MAS Frame 46709 of CS 10110 is illustrated in FIG. 469 of U.S. patent application Ser. No. 266,539 and described in Section 4.E.d.2.c.c; FIG. 12 illustrates MAS Frame 1201 of the present invention. Like MAS Frames 46709, MAS Frame 1201 contains an area for local storage, an area for linkage pointers for arguments, and areas for information used during execution of a Return SIN. However, the complexity of the latter areas has been greatly reduced.

A MAS Frame 1201 may be either an NCALL Frame 1239 or a GCALL Frame 1241. NCALL Frames 1239 are produced by the execution of NCALL and NCALLN SINs; GCALL Frames 1241 are produced by the execution of GCALL SINs. As may be seen from FIG. 12, a GCALL Frame 1241 has the same fields as an NCALL Frame 1239, and in addition contains ESSA 1237. Beginning at the top of NCALL Frame 1239, there is Local Storage 10420, containing storage used for variables contained in Procedure 1016 called by the Call SIN. Next comes Basic State Area (BSA) 1215, which identifies the kind of Call SIN which created MAS Frame 1201 and contains the state required for a return to a calling Procedure 1016 which shares a PED 1013 with the called Procedure 1016. BSA 1215 has the following fields:

OLD_FP_PTR Field 1205 contains an object-relative pointer specifying the location of FP in MAS Frame 1201 belonging to calling Procedure 1016.

NF_BOT_PTR Field 1207 contains an object-relative pointer specifying the bottom of OS Area 1219 in MAS Frame 1201. In NCALL Frames 1239, this is the bottom of MAS Frame 1201; in GCALL Frames 1241, it is the top of ESSA 1237.

OLD_PC_OFF Field 1207 contains the offset from PBP of the SIN at which calling Procedure 1016 is to resume execution. This Field is 30 bits long.

Flags_1 Field 1211 and Flags_2 Field 1213 contain flags set by the Call SINs and used by the Return SIN to determine the kind of Call SIN which made MAS Frame 1201. These flags will be explained in more detail below.

Flags_1 Field 1211 contains two bits. The left bit specifies when set that Flags_2 Field 1213 is being used in this MAS Frame 1201. The right bit specifies the kind of MAS Frame 1201. If the bit is set, MAS Frame 1201 is a GCALL Frame 1241; otherwise, MAS Frame 1201 is an NCALL Frame 1239. NCALL sets these two bits to 00 and GCALL and microcode-to software call sets them to 11. In Flags_2 Field 1213, four bits are important for this discussion. The bits are numbered from the left, with the leftmost bit as bit 0:

Bit 27, Microcode-to-software Call Flag: When this bit is set, the call which created GCALL Frame 1241 was a microcode-to-software call.

Bit 28, Cross Domain Entry Flag: When this bit is set, the call which created GCALL Frame 1241 was the first of a sequence of calls to Procedures 1016 having the same Domain of Execution.

Bit 29, Cross Domain Exit Flag: When this bit is set, the call which created GCALL Frame 1241 was the last of a sequence of calls to Procedures 1016 having the same Domain of Execution.

Bit 30: Non-local GOTO Flag: Non-local GOTOs are explained in detail in U.S. patent application Ser. No. 266,539 4.E.d.8.b.b. When this bit is set, it indicates that a non-local GOTO involving this MAS Frame 1201 is currently being executed.

The next portion of MAS Frame 1201 is Linkage Pointers 1217. There is one linkage pointer in Linkage Pointers 1217 for each Name specifying an argument in the Call SIN which created MAS Frame 1201. The Call SINs reverse the order of arguments in the high-level language procedure invocations corresponding to the Call SINs, and when the Call SIN creates MAS Frame 1201, it places the linkage pointer to the argument corresponding to the first Name specifying an argument in the Call SIN immediately above OS Area 1219, the next linkage pointer above the first and so on. Consequently, the order of argument pointers in Linkage Pointers 1217 relative to FP corresponds to the order of arguments in the high-level language procedure invocation corresponding to the Call SIN.

OS Area 1219 contains offsets from FP of information used by KOS to handle non-local GOTOs and conditions. These offsets correspond to Catch List Off 46927, Clean Up List Off 46925, and Frame Top Off 46921 of FIG. 469. For details, see the description of these fields in U.S. patent application Ser. No. 266,539 4.E.d.1.c.c.

Extended State Save Area (ESSA) 1237 is present only in GCALL Frames 1241. It contains the additional saved state required for returns from Procedures 1016 called by GCALL SINs. Initial Target Field 1221 contains a copy of the resolved pointer to called Procedure 1016 obtained from the evaluation of n1 in the GCALL SIN. It is present in GCALL Frame 1241 to enable a debugger to determine which Procedure 1016 was called by the GCALL SIN which produced GCALL Frame 1241. The remaining fields in ESSA 1237 contain saved state from the execution of calling Procedure 1016:

OLD_SDP Field 1223 contains a resolved pointer specifying SDP for the execution of calling Procedure 1016.

OLD_PBP Field 1225 contains a resolved pointer specifying PBP for the execution of calling Procedure 1016.

TY Field 1227 indicates that the area following it is an ESSA 1237, and Ver Field 1229 indicates the version of ESSA 1237.

DIA 1231 is an integer which corresponds to a value of SIP 30309 and specifies the S-language required by calling Procedure 1016's SINs.

OLD_SP_PTR 1233 is a resolved object-relative pointer specifying the location of the topmost bit in calling Procedure 1016's MAS Frame 1201.

OLD_NT_PTR, finally, is a resolved object-relative pointer specifying the location of Procedure 1016's Name Table 305.

The chief difference between MAS Frame 1201 of the present invention and MAS Frame 46709 of CS 10110 are the following: the information required to return from a NCALL or NCALLN has been separated from the information required to return from GCALL; the kind of MAS Frame 1201 and the kind of Call SIN which created it are specified by flags in BSA 1217; NCALL Frames 1239 and GCALL Frames 1241 are identical except for the presence of ESSA 1237 in the latter.

4. Operation of the NCALL and NCALLN SINs

When a Call is made by an NCALL or NCALLN SIN, the following operations are performed by the FU 10120 microcode which interprets these SINs:

The current PC, current FP, current PBP, and current SP are saved in FU 10120 registers.

The number of arguments in the Call is obtained from OM Field 705 of SOP 701.

The next Operand Syllable 707 is parsed. In the case of NCALL, Operand Syllable 707 is an I-stream Literal 709. Its value is multiplied by 16 and added to the current PC value, PC specifies the location of ADS Field 1015 of called Procedure 1016. In the case of NCALLN, Operand Syllable 707 is a Name specifying the location of ADS Field 1015 of Procedure 1016. The Name is resolved to obtain a descriptor for that location and PC is set from the descriptor.

SP is incremented by SP MOD 128 and the resulting value, which is the location of the bottom of the new NCALL Frame 1239, is saved.

OS Area 1219 is added to new MAS Frame 1201 and SP is incremented by 128.

Beginning with the first Name representing an argument in the NCall SIN, for each Name, the Name is resolved, the resulting descriptor is converted to a pointer, the pointer is placed on NCALL Frame 1239, and SP is incremented by 128. At the end of these operations, Linkage Pointers 1217 are on new MAS Frame 1201.

BSA 1215 is placed on NCALL Frame 1239 and SP is incremented by 128. Its Fields are set as follows: OLD_FP_PTR 1205 is set to the value of saved FP, that is, the value of FP in Caller's Frame 1243; NF_BOT_PTR 1207 is set to the saved value which specified the bottom of NCALL Frame 1239; OLD_PC_OFF 1209 is set to specify the SIN following the CALL SIN; Flags_1 1211 is set to 00.

FP is set to the current value of SP.

The I-stream Literal in ADS Field 1015 is parsed, its value is multiplied by 128, and that number of bits is allocated as Local Storage 10420, and SP is incremented to point to the top of Local Storage 10420.

The first SIN of called Procedure 1016 is executed. Since calling Procedure 1016 and called Procedure 1016 share a PED 1013, NCALL and NCALLN need not change or save NTP, PBP, SIP, or SDP.

5. Operation of the GCALL SIN

The operation of the GCALL SIN differs in four respects from that of the NCALL or NCALLN SINs: GCALL must locate a Terminal Entry Descriptor 1101 for called Procedure 1016, it must create an ESSA 1237 on called Procedure 1016's CALL Frame 1241, and it must locate called Procedure 1016's PED 1013 and reset NTP, PBP, SIP, and SDP from values contained in called Procedure 1016's PED 1013.

After determining the number of arguments and saving FP, PC, and PBP as described for NCALL, FU 10120 microcode executing GCALL must locate Terminal Entry Descriptor 1101 for called Procedure 1016. The location of Terminal Entry Descriptor 1101 commences with the evaluation of nl of GCALL. The evaluation of the Name yields a pointer containing the location of an Entry Descriptor 1011. If Entry Descriptor 1011 is not in the same Procedure Object 1001 as calling Procedure 1016, FU 10120 microcode first checks whether the Subject executing calling Procedure 1016 has Execute access to Procedure object 1001 containing called Procedure 1016. If not, the Call aborts. If the Subject does have Execute access, FU 10120 microcode checks the Domain of Execution Attribute of Procedure Object 1001 containing called Procedure 1016. If the Domain of Execution Attribute is different from that of Procedure Object 1001 containing calling Procedure 1016, the Call is a Cross-domain Call, described below. If the Call is not a cross-domain Call, FU Microcode examines Gate Limit Field 47203 to determine whether Entry Descriptor 1011 is a Gate. If it is not, the Call aborts. Otherwise, FU 10120 microcode executing GCALL examines TY Field 1107 to determine whether Entry Descriptor 1011 is a Terminal Entry Descriptor 1101 or an Indirect Entry Descriptor 1113. If it is the latter, FU 10120 microcode obtains the location of a linkage pointer to another Entry Descriptor 1101 from LP_PTR Field 1115. It then performs a pointer resolution operation on the linkage pointer and uses the resulting resolved pointer to locate the new Entry Descriptor 1011. If Entry Descriptor 1011 is another Indirect Entry Descriptor 1113, the microcode repeats the operation just described.

If Entry Descriptor 1011 is a Terminal Entry Descriptor 1101, FU 10120 microcode begins constructing a GCALL Frame 1241. It first increments SP by SP MOD 128 and then builds ESSA 1237 as follows: It first sets TY Field 1227 and VER Field 1229 to the proper values and then saves an object-relative pointer to the top of Caller's Frame 1243 in OLD_SP_PTR 1233 and an object-relative pointer to Name Table 305 in OLD_NT_PTR 1235. Thereupon it copies current PBP into OLD_PBP 1225, current SDP into OLD_SDP 1223, and the pointer obtained from evaluating nl of GCALL into Initial Target 1221. At the end of the operation, SP is set to point to the top of ESSA 1237. GCall then adds Linkage Pointers 1217 and BSA 1215 as described for NCALL, except that the right-most bit of Flags_1 Field 1211 is set to 1.

This done, FU 10120 microcode uses the value in PED_PTR Field 1109 of Terminal Entry Descriptor 1101 to locate PED 1013 for called Procedure 1016 and sets PBP, NTP, SIP, and SDP from PBP_PTR Field 1115, NTP_PTR Field 1117, SIP Field 30309, and SDPP Field 30313 respectively. Finally, FU 10120 microcode uses the value in CSO Field 1103 to set PC to the location of ADS Field 1015 in called Procedure 1016, fetch the I-stream Literal 709 in that field, and complete GCALL Frame 1241 as explained in the discussion of NCALL. Thereupon, FU 10120 microcode executes the first SIN of Called Procedure 1016.

On a Cross-domain Call, FU 10120 microcode first constructs ESSA 1237, Linkage Pointers 1217, and BSA 1215 as described above. In BSA 1215, the rightmost bit of Flags_1 is set to 1 and bit 29 of Flags_2 is set to 1, indicating a cross-domain exit. Then it stores a resolved UID Pointer to the top of BSA 1215 in Secure Stack Object 10336. The next step is examining AIA_PTR Field 1111 of Terminal Entry Descriptor 1111 to see whether an AIA Array for Procedure 1016 is present in Argument Information Arrays 1017. If it is, FU 10120 GCALL microcode performs a Trojan Horse Argument Check, as described in U.S. patent application Ser. No. 266,539 4.E.d.5.e.e. Then KOS microcode invoked by GCALL locates MAS Object 46703 belonging to the domain specified by the Domain of Execution Attribute of Procedure Object 1001 containing called Procedure 1016 and sets the SP register to the location of the top of MAS Stack 00502 in that object. The next step is to copy ESSA 1237, Linkage Pointers 1217, and BSA 1215 into that MAS Object 46703 above the location specified by SP, incrementing SP as it does so. The manner in which MAS Object 46703 is located is described in detail in U.S. patent application Ser. No. 266,539 4.E.d.5.e.e. On the copying operation, bit 28 of Flags_2 is set to 1, indicating a cross-domain entrance. After the copying operation has been completed, GCALL microcode completes the call as described above.

6. Operation of the Return SIN

The manner in which the Return SIN operates depends upon whether called Procedure 1016 was called by a NCALL or NCALLN SIN or by a GCALL SIN, and in the latter case, upon whether the call was a cross-domain call. As indicated above, the type of call which created a given MAS Frame 1201 is specified in Flags_1 Field 1211 and Flags_2 Field 1213 of BSA 1215. Consequently, the manner of operation of the Return SIN is determined by the settings of Flags_1 Field 1211 and Flags_2 Field 1213.

Beginning with returns from Procedures 1016 invoked with NCALL or NCALLN, in this case, the rightmost bit of Flags_1 Field 1211 is set to 0 and MAS Frame 1201 is an NCALL Frame 1239. Since the state specified by PED 1013 does not change on an NCALL, all that FU 10120 Return microcode which executes the Return SIN need do is set FP to the value contained in OLD_FP_PTR Field 1205, PC to the value specified in OLD_PC_OFF Field 1209, and SP to the value specified in NF_BOT_PTR 1207. Thus, at the end of the Return operation, PC specifies the SIN following the NCALL or NCALLN SIN in calling Procedure 1016 and FP specifies calling Procedure 1016's MAS Frame 1201.

In the case of non-cross-domain GCALL, the rightmost bit of Flags_1 Field 1213 is set to 1. Since calling Procedure 1016 and called Procedure 1016 do not share a PED in this case, FU 10120 Return microcode must not only restore FP, SP, and PC, but also PBP, SDP, SIP, and NTP. As shown above, the values required to do this are contained in ESSA 1237. Hence, FU 10120 Return Microcode restores FP from BSA 1215 and then uses the value in NF_BOT_PTR Field 1207 to locate ESSA 1237. Having found ESSA 1237, it restores SIP from DIA 1231, NTP from OLD_NTP_PTR 1235, PBP from OLD_PBP 1225, SDP from OLD_SDP 1223, and SP from OLD_SP_PTR 1223. Then FU 10120 Return microcode restores PC by adding the value contained in OLD_PC_OFF 1209 to PBP and finishes as described above.

In the case of cross-domain GCALL, finally, the leftmost bit of Flags_1 Field 1213 is set to 1 and both bits 29 and 30 of Flags_2 Field 1213 are set to 1. In this case, FU 10120 Return microcode invokes KOS microcode, which restores SP from the value which cross-domain GCALL stored in Secure Stack Object 10336. Thereupon, the execution of the Return SIN continues as described above for returns from non-cross-domain GCALLs.

7. Summary of Improvements in Calls and Returns in the Present Invention

The improvements in calls and returns resulting from the changes in PO 1016 and MAS Frame 1201 in the present invention may be readily apprehended by comparing the description of calls and returns in U.S. patent application Ser. No. 266,539 4.E.d with the above description of the operations in the present invention. The improvements may be summarized as follows:

The use of Entry Descriptors 1011 in Gates 1009 and the addition of AIA_PTR 1111 to Terminal Entry Descriptor 1101 have reduced the amount of time required to locate a called Procedure 1016 and determine whether a call is valid.

The addition of ADS Field 1015 to Procedure 1016 allows NCALL and NCALLN to allocate Local Storage 10420 without reference to Terminal Entry Descriptor 1101.

Since NCALL and NCALLN need not refer to Terminal Entry Descriptor 1101, NCALL can reset PC directly from the I-stream Literal 709 following the NCALL SOP 701 and NCALLN can reset PC after resolving nl.

Making GCALL Frame 1241 an extension of NCALL Frame 1239 allows all Return SINs to begin in the same fashion.

Placing flags indicating the kind of MAS Frame 1201 and the state which must be restored by a return from NCALL or NCALLN in BSA 1215 makes it possible for Return SINS in Procedures 1016 called by NCALL or NCALLN to complete the return simply by restoring state from BSA 1215.

Placing flags indicating whether a GCALL is a cross-domain call in BSA 1215 and the state which must be restored in a non-cross-domain call makes it possible for Return SINs in Procedures 1016 called by non-cross-domain GCALL to complete the return by restoring state from BSA 1215 and ESSA 1237. Only returns from cross-domain GCALL involve SS Object 10336.

In addition, calls and returns of the present invention benefit from other improvements already discussed. In CS 10110, literal syllables in the Call SINs specified the number of arguments; in the present invention, the last 8 bits of the SOP specifies the number of arguments. In CS 10110, there was only one kind of Name, and all arguments were specified by these Names; in the present invention, arguments may be specified by either Table Names or Immediate Names. In CS 10110, finally, different Procedures 00602 could have operand syllables with different sizes, and a Mediated Call SIN therefore had to first save K, the value representing syllable size, for calling Procedure 00602, and then set K to its value for called Procedure 00602. A Return SIN had to restore calling Procedure 00602's value for K. In the present invention, all Procedures 00602 have syllables containing 16 bits, and it is no longer necessary to save, set, or restore K.

F. Linkage Pointer Encachement

In CS 10110 and the present invention, linkage pointers are pointers to items which cannot be located by means of displacements from the ABPs. Three large classes of items which are located by means of linkage pointers are arguments for a Procedure 1016, pointers to Entry Descriptors 1011 in different Procedure Objects 1001, and static data which is not located in Static Data Block 46863. As was explained with regard to FIG. 12, linkage pointers for arguments are contained in Linkage Pointers 1217 in MAS Frame 1201. Since Linkage Pointers 1217 are located below FP, Names representing argument pointers in Linkage Pointers 1217 specify negative displacements from FP. Linkage Pointers to Entry Descriptors 1011 and to static data not located in Static Data Block 46863 are similarly located at negative displacements from SDP in Static Data Block 46863, as can be seen from FIG. 468 of U.S. patent application Ser. No. 266,539. In the following discussion, the part of Static Data Block 46863 containing linkage pointers is termed Static Linkage Pointers 46865 to distinguish it from Linkage Pointers 1217 in MAS Frame 1201.

Compilers generating SINs for Computer System 10110 and the present invention do not produce SINs which specify addresses at negative displacements from SDP and FP as destinations for data. Thus, as long as a MAS Frame 1201 or a Static Data Block 46863 exists in Memory 801, the values of the linkage pointers contained therein will not change. Because linkage pointers are always located at negative offsets from SDP or FP and do not change as long as SDP or FP is valid, the values of linkage pointers may be encached in Name Translator 811. The fact that the linkage pointers do not change value means that a linkage pointer may be copied into a cache without concern for future changes in the original, and the fact that linkage pointers are located at negative offsets means that the FU 10120 microcode which maintains the cache containing the linkage pointers can detect NTEs or Immediate Names 209 specifying linkage pointers and place the values of the pointers instead of their locations in the cache.

Encachement of the values of linkage pointers in Name Translator 811 is advantageous because it allows both Immediate Names 209 specifying negative displacements from FP or SDP and Names whose NTEs specify indirect references using linkage pointers as the base location to be resolved without fetching the value of the linkage pointer from Memory 801. All that is necessary to create a descriptor for the data at the location specified by the linkage pointer's value is to add the length and type information for the data to the location specified by the encached linkage pointer value. Consequently, the resolution of such an Immediate Name 209 or Name takes no longer than the resolution of a Name or Immediate Name 209 which specifies a direct reference. When a pointer cannot be encached, on the other hand, only a descriptor for the pointer's location may be encached, and the Name Resolution operation must first fetch the pointer from the location in Memory 801 specified by the descriptor and then perform a pointer-to-descriptor conversion to obtain the descriptor for the data item represented by the Name or Immediate Name 209.

The increased efficiency offered by the encachement of linkage pointers is particularly important with regard to linkage pointers to arguments. Since the purpose of a Procedure 1016 is to process the data used as arguments to it there will be frequent references to the arguments in Procedure 1016 and consequently many SINs containing Names specifying indirect references from the linkage pointers. Efficient resolution of these Names is thus a prerequisite to efficient execution of most Procedures 1016 in CS 10110 and the present invention.

While encachement of linkage pointers was possible in CS 10110, implementing it was difficult because Names were nothing but indexes into NTE 10350, and there was therefore neither a way of distinguishing a Name whose NTE specified a linkage pointer as a base location for the data represented by the Name from any other Name nor of determining what Names would refer to a given linkage pointer. This fact had two consequences:

Separate caches could not be employed for descriptors corresponding to linkage pointers, since Names specifying linkage pointers were not distinguishable from other Names.

There was no way of determining during the execution of a Call SIN what Names in called Procedure 1016 corresponded to the arguments; consequently, there was no way of pre-encaching descriptors corresponding to argument pointers, even though the descriptors had to be calculated as part of the execution of the Call SIN. Encachement could only occur on a miss, and at that time, the descriptor was no longer available. Name Resolve cache miss microcode therefore had to fetch the argument pointer from Memory 801 and convert it to a descriptor in order to encache it.

As will be seen in the ensuing discussion, the presence of Immediate Names 209 in the present invention solves both of these problems and greatly simplifies the encachement of linkage pointer values in the present invention.

1. Linkage Pointer Encachement in the Present Invention

As explained in the discussion of the Call and Return SINs, the position of linkage pointers relative to FP in Linkage Pointers 1217 is determined by the order of arguments in the Call SIN, and this order is in turn determined by the order of arguments in the high-level language procedure invocation corresponding to the Call SIN. In CS 10110 and the present invention, the relationship between the order of linkage pointers relative to FP and the order of arguments in the high-level language procedure invocation is the same for all invocations, regardless of the high-level language used. The order of arguments used in the high-level language procedure invocation of a given Procedure 1016 is determined by the source text for Procedure 1016 and is therefore known to the compiler when it compiles Procedure 1016. Given the order of arguments and the common formats of all MAS Frames 1201 in the present invention the high-level language compiler can generate Immediate Names 209 for references to arguments in Procedure 1016's SINs. For example, as may be seen from FIG. 12, the linkage pointer for the first argument to a given Procedure 1016 is always at offset −256 from FP. Consequently, a reference to the first argument may always be expressed by an Immediate Name 209 with fields set as follows:

NTY 203: 00, specifying FP.

IB 205: 1, specifying an indirect reference.

32_DISP 211: −8, which, when multiplied by 32, yields −256, the offset of the linkage pointer for the first argument.

An Immediate Name 209 specifying the second argument would have fields set as described above, except that 32_DISP 211 would be set to −12, an Immediate Name 209 specifying the third argument would have 32_DISP 211 set to −16, and so forth.

While the locations of linkage pointers in MAS Frame 201 are a consequence of the manner in which Call SINs are executed in the present invention, the locations of linkage pointers in Static Data Block 46863 are directly under the control of the compilers. As explained in detail in Section 4.E.d.4 of U.S. patent application Ser. No. 266,539, the first time that a Process 00610 executes a SIN in a given Procedure Object 1001 which contains a Name specifying the SDP ABP, SDPP 30313 in PED 1013 belonging to the SIN's Procedure 1016 is resolved, and in the process of resolving SDPP 30313, a Static Data Block 46863 is created using information in Static Data Prototype 30317 specified by SDPP 30313. By convention, all compilers in CS 10110 and the present invention specify that negative offsets from SDP in Static Data Block 46863 contain Static Linkage Pointers 46865. Since the location of individual Static Linkage Pointers 46865 in Static Data Block 46863 is controlled by the compiler, the compiler can generate Immediate Names 209 as described above, but specifying SDP, for references to Procedures 1016 and data specified by Static Linkage Pointers 46865.

As explained above, Names specifying NTEs which in turn specified linkage pointers as base locations could not be differentiated from other Names in CS 10110 without reference to the NTE. In the present invention, however, Immediate Names 209 specify linkage pointers as base locations, and as described above, Immediate Names 209 which do so all contain NTY Fields 203 specifying SDP or FP, an IB Field 205 which is set to 1, and a 32_DISP Field 211 which, when multiplied by 32, specifies an offset which is evenly divisible by 128. This is thus only a single Immediate Name 209 which may specify a given linkage pointer in a given execution of a Procedure 1016, and more important, if a linkage pointer's position relative to FP or SDP is known, it is possible to calculate its Immediate Name 209. Furthermore, an Immediate name 209 specifying a linkage pointer may be differentiated not only from Table Names 201, but also from other Immediate Names 209.

The above facts have two important consequences: First, the fact that Immediate Names 209 specifying linkage pointers may be differentiated from other Names makes it possible in the present invention to employ special cache means for linkage pointers. Second, the fact that there is only a single Immediate Name 209 which may specify a given linkage pointer in a given execution of a Procedure 1016 makes it possible to preload caches of argument pointers when a Call SIN is executed. As represented in FIG. 13, the present invention takes advantage of both these facts. FIG. 13 is a conceptual block diagram of linkage pointer encachement in the present invention. FIG. 13 has two main parts: Name Translator 811 and Memory 801. In Name Translator 811 there is shown Cache Means 1301. Cache Means 1301 is subdivided into three parts:

General Cache Entries 1303, containing information required to resolve all Table Names 201 and those Immediate Names 209 which do not specify indirect references by means of linkage pointers.

Entries for FP-Negative Immediate Names 1305, containing argument pointers, i.e., linkage pointers at negative offsets from FP.

Entries for SDP-Negative Immediate Names 1307, containing linkage pointers at negative offsets from SDP.

Memory 801 contains MAS 00502, with Linkage Pointers 1217, as previously described, and Static Data Block 46863, with Static Linkage Pointers 46865. As indicated by the brackets and arrows, descriptors derived from argument pointers in Linkage Pointers 1217 are encached in Entries for FP-Negative Immediate Names 1305 and descriptors derived from Static Linkage Pointers 46865 are encached in Entries for SDP-Negative Immediate Names 1307.

In the present embodiment of the present invention, cache Means 1301 corresponds to NC 10226. NC 10226 is an associative cache, and thus, the subdivision into three parts is a simple consequence of the fact that Immediate Names 209 specifying linkage pointers have the special forms described above. In other embodiments, Cache Means 1301 may in fact comprise two or more caches: General Cache Entries 1303 may be an associative cache responsive to Table Names 201 and Immediate Names 209 which do not specify indirect references involving linkage pointers, while Entries for FP-Negative Immediate Names 1305 and Entries for SDP-Negative Immediate Names 1307 may be caches addressable by 32_DISP Field 211 for Immediate Names 209 which do specify indirect references involving linkage pointers. The latter type of cache is possible in the present invention for two reasons: first, the values of NTY Field 203 and IB Field 205 in such Immediate Names 209 immediately distinguish them from other Names and distinguish such Immediate Names 209 specifying FP from such Immediate Names 209 specifying SDP. It is thus possible to construct special caches which respond only to such Immediate Names or indeed only to such Immediate Names 209 specifying SDP or those specifying FP and to present a Name simultaneously to such specialized caches and to a general associative cache. Second, 32_DISP Field 211 in such Immediate Names 209 is in fact the FP or SDP-relative address of the linkage pointer. If the linkage pointers are encached in caches corresponding to Entries for FP-Negative Immediate Names 1305 or Entries for SDP-Negative Immediate Names 1307 an order corresponding to their orders in Linkage Pointers 1217 or Static Linkage Pointers 46865 respectively, then 32_DISP Field 211 may serve directly as the address of the encached linkage pointer in Cache Means 1301.

In the present invention, Entries for FP-Negative Immediate Names 1305 may be preloaded by Call Microcode as part of the execution of a Call SIN. As pointed out in the discussion of the Call SINs, when a Call SIN is executed, Call microcode resolves each Name specifying an argument in the Call SIN, converts the descriptor to a pointer, and places the pointer on Linkage Pointers 1217. The descriptor corresponding to the pointer is of course the value which should be encached in Entries for FP Negative Immediate Names 1305. In CS 10110, there was no way of determining during a Call what Name in called Procedure 1016 corresponded to the argument, and thus, there was no way for Call microcode in CS 10110 to encache the descriptor in NC 10226. In the present invention, on the other hand, Call microcode can determine from an argument pointer's position in Linkage Pointers 1217 in the new MAS Frame 1201 being constructed by the Call microcode what value 32_DISP Field 211 in Immediate Names 209 referring to the argument has. Since the values of NTY Field 203 and IB Field 205 are given in Immediate Names 209 referring to argument pointers, if the value of 32_DISP Field 211 is known, the form of Immediate Name 209 in called Procedure 1016 referring to the argument is known. If, as in the present embodiment of the present invention, Cache Means 1301 is an associative cache, Call microcode may encache the descriptor corresponding to the argument pointer by constructing Immediate Name 209 corresponding to the argument pointer, using Immediate Name 209 to locate an entry in Cache Means 1301, and placing the descriptor in the entry. If Entries for FP-Negative Immediate Names 1305 is a cache addressable by the value of 32_DISP Field 211, on the other hand, the descriptor may be placed directly at the proper location in Entries for FP-Negative Immediate Names 1305 without constructing Immediate Name 209. In either case, preloading reduces the number of misses in Cache Means 1301 during the execution of a Procedure 1016. Furthermore, since the descriptors corresponding to the argument pointers are available during the execution of the Call SINs, preloading may be done without fetching the value of the argument pointer from Memory 801. Both the reduction in the number of misses in Cache Means 1301 and the increased efficiency of loading increase, the speed with which the present invention executes Procedures 1016.

2. Implementation of Linkage Pointer Encachement in the Present Embodiment

In the present embodiment, Cache Means 1301 is implemented by means of NC 10226. A single descriptor, that corresponding to the argument pointer for the first argument of the Call SIN, is preloaded by Call microcode. Otherwise, NC 10226 is loaded as in CS 10110 by Name Resolve cache miss microcode. In the present embodiment, Name Resolve cache miss microcode examines the Name which caused the miss. If the Name is an Immediate Name 209 specifying a linkage pointer, Name Resolve cache miss microcode obtains the value of the linkage pointer from Memory 801, converts the pointer to the AON and Offset portions of a descriptor, and adds the necessary type and length information. Cache miss microcode then encaches the resulting descriptor for the argument in NC 10226. The entry RES_C_Miss in RESOLVER_TRAPS illustrates encachement of linkage pointers in the present invention, and the entry NCALL_END of NEIGHBORHOOD_CALL illustrates preloading. As mentioned above, other embodiments of the present invention may preload additional argument pointers and may employ special caches for linkage pointers.

The invention may be embodied in yet other specific forms without departing from the spirit or essential characteristics thereof. Thus, the present embodiments are to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. In an improved digital computer system including
   (A) memory means for performing memory operations including storing and providing items of data including instructions in response to memory commands, each one of said memory commands specifying one said memory operation, an address of one of said items of data in said memory means, and a length of said one data item and (B) processor means connected to said memory means for providing said memory commands in response to said instructions, and wherein said items further include names representing other said items;

said names include table names, each said table name being associated with a name table entry of said items;

said instructions contain said names;

said items further include varying-length items, each one of said varying length items containing a varying number of data elements of a single size and current length items associated with said varying-length items, said current length item associated with each of said varying-length items serving to specify the current length of said associated varying-length item; and said processor means includes name processing means responsive to said names for producing said address and said length of said represented item in response to said name representing said represented item, said name processing means including table name processing means responsive to said table names and to said name table entries associated with said table names for producing said address and said length of said item represented by said table name by processing said associated name table entry, the improvements comprising:

(1) a current number of elements item of said current length items whose value is the current number of said elements in said associated varying-length item;

(2) an improved said name table entry associated with said table names representing said varying-length items, said improved name table entry including (a) a current number of elements item specifier specifying said address of said current number of elements item associated with said represented varying-length item and (b) an element size specifier specifying said single size of said elements in said represented varying-length item; and (3) an improved said name processing means responsive to said number of elements item specifier and to said element size specifier for deriving said address of said current number of elements item associated with said represented varying-length item from said current number of elements item specifier, fetching said current number of elements item from said memory means to said processor means, deriving said single size of said elements from said size specifier, and deriving a current said length of said represented varying-length item using said value of said current number of elements item and said single size.

2. In the improved digital computer system of claim 1, and wherein:

said element size specifier is an element size name of said names representing an element size item of said items and said improved name processing means derives said size of said elements from said element size table name by producing said address and said length of said represented element size item using said element size name and fetching said element size item from said memory means; and said improved name processing means derives said current length by multiplying the value of said element size item by the value of said current number of elements item.

3. In the improved digital computer system of claim 1, and wherein:

said element size name is one of said table names and said improved name processing means derives said address and said length of said element size item from said name table entry associated with said element size name.

4. In the improved digital computer system of claim 1, and wherein:

said processor means includes a plurality of architectural base registers containing architectural base values;

said names further include immediate names, each one of said immediate names specifying one of said plurality of architectural base registers and a displacement from said architectural base value in said specified architectural base register;

said improved name processing means includes means for producing said address from said immediate name by adding said specified displacement to said architectural base value in said specified architectural base register; and said element size name is one of said immediate names.

5. In the improved digital computer system of claim 1, and wherein:

said processor means includes a plurality of architectural base registers containing architectural base values;

said names further include indirect immediate names, each one of said indirect immediate names specifying one of said plurality of architectural base registers and a displacement from said architectural base value contained in said specified architectural base register of a pointer of said items representing said address of said represented item; and said improved name processing means includes means for producing said address of said pointer from said indirect immediate name by adding said specified displacement to said architectural base value in said specified architectural base register to obtain said address of said pointer and fetching said pointer into said processor means; and said element size name is one of said indirect immediate names.

6. In the improved digital computer system of claim 1, and wherein:

said element size specifier is a constant value representing said size of said elements and said name processing means derives said current length by multiplying said constant value by said current number of elements item.

7. In the improved digital computer system of claim 1, and wherein:

said current number of elements item associated with each one of first certain ones of said varying length items is a dope vector item whose said address is at at a predetermined displacement relative to said address of said associated one of said first certain ones of said varying-length items;

said current number of elements item specifier in said name table entry associated with said table name representing said one of said certain ones of said varying-length items is a constant specifying said predetermined displacement; and said improved name processing means responds to said current number of elements item specifier by adding said constant to said address of said one of said certain ones of said varying-length items represented by said table name associated with said name table entry to obtain said address of said associated dope vector item, fetching said associated dope vector item from said memory means to said processor means, and deriving said current length using said dope vector item and said single size.

8. In the improved digital computer system of claim 1, and wherein:

said current number of elements item specifier in said name table entry for said table name representing each one of said second certain ones of said varying-length items is a current number of elements item name of said names representing said current number of elements item; and said improved name processing means derives said address of said current number of elements item from said current number of elements item name, fetches said current number of elements item into said processor means, and derives said current length using said current number of elements item and said single size.

9. In the improved digital computer system of claim 1, and wherein:

said current number of elements item specifier in said name table entry specified by said table name representing each one of said varying-length items is in the alternative a constant specifying a displacement of said address of said number of elements item relative to said address of said varying-length item represented by said name associated with said name table entry and a current number of elements item name of said names representing said current number of elements item;

said improved name processing means obtains said current number of elements item when said number of elements specifier is said constant by adding said constant to said address of said varying-length item represented by said table name to obtain said address of said current number of elements item and fetching said current number of elements item into said processor means and obtains said current number of elements item when said number of elements specifier is said name by obtaining said address of said current number of elements item from said name and fetching said current number of elements item into said processor means;

said element size specifier is in the alternative an element size name of said names representing an element size item of said items, a first constant value representing said size of said elements, and a second constant value representing a number of left shifts; and said improved name processing means produces said address and said length of said represented element size item from said element size name, fetches said element size item into said processing means, and multiplies said current number of elements item by said element size item when said element size item is said element size name, multiplies said current number of elements item by said first constant when said element size specifier is said first constant, and shifts said current number of elements item left as specified by said second constant when said element size specifier is said second constant.

10. In an improved digital computer system including (A) memory means for performing memory operations including storing and providing items of data including instructions in response to memory commands, each one of said memory commands specifying one said memory operation, an address in said memory means of one of said items, and a length of said one item and (B) processor means connected to said memory means for providing said memory commands in response to said instructions, and wherein said items further include names representing other said items, said names include table names, each said table name being associated with a name table entry of said items, said instructions include said names, said processor means includes name processing means responsive to said names for producing said address and said length of said represented item using said names, said name processing means including table name processing means responsive to said table names and to said name table entries associated with said table names for producing said address and said length of said said item represented by said table name by processing said associated name table entry, the improvements comprising:

(1) an improved name table entry including a basic name table entry including a length suffix specifier for specifying whether said improved name table entry includes a length suffix for specifying said length of said represented item and a first constant length specifier when said length suffix specifier specifes that said improved name table entry does not contain said length suffix and said length suffix when said length suffix specifier specifies that said improved name table entry includes said length suffix; and (2) an improved said name processing means responsive to said length suffix specifier for obtaining said length from said first constant length specifier when said length suffix specifier specifies that said improved name table entry does not contain said length suffix and otherwise obtaining said length from said length suffix.

11. In the improved digital computer system of claim 10, and wherein:

said basic name table entry further includes a length suffix type specifier specifying how said improved name processing means is to obtain said length from said length suffix when said length suffix specifier specifies that said improved name table entry includes said length suffix and said improved name processing means is responsive to said length suffix type specifier.

12. In the improved digital data processing system of claim 11, and wherein:

said length suffix type specifier specifies that said length suffix is a second constant length specifier and said improved name processing means responds to said length suffix type specifier by using said second constant length specifier as said length.

13. In the improved digital data processing system of claim 11, and wherein:
said items further include
varying-length items, each one of said varying length items containing a varying number of data elements of a single size and
current number of element items associated with said varying-length items, said current number of elements item associated with each of said varying-length items serving to specify the current number of said data elements in said associated varying-length item; and
said length suffix includes
a number of elements name of said names representing said current number of elements item and
an element size specifier specifying the size of said elements in said represented item and
said improved name processing means responds to said length suffix type specifier by using said number of elements name to obtain said address of said current number of elements item, fetching said current number of elements item into said processor means, and deriving said length using said current number of elements item and said element size specifier.

14. In the improved digital data processing system of claim 11, and wherein:
said items further include
varying length items, each one of said varying length items containing a varying number of data elements of a single size and
current number of element items associated with said varying-length items, said current number of elements item associated with each of said varying-length items serving to specify the current number of said data elements in said associated varying-length item; and
said associated current number of elements item is located at a predetermined displacement from said address of said associated varying-length item;
said length suffix type specifier includes a constant specifying said predetermined displacement;
said length suffix includes an element size specifier specifying said single size of said elements in said represented item; and
said improved name processing means responds to said length suffix type specifier by adding said constant to said address of said represented item to obtain said address of said current number of elements item, fetching said current number of elements item into said processing means, and deriving said length using said current number of elements item and said element size specifier.

15. In a digital computer system including
(A) memory means for performing memory operations including storing and providing items of data including instructions in response to memory commands, each one of said memory commands specifying one said memory operation, an address in said memory means of one of said items, and a length of said one item and (B) processor means connected to said memory means for providing said memory commands in response to said instructions,
and wherein
said items further include names representing other said items;
said names include table names, each said table name being associated with a name table entry of said items;
said instructions contain said names;
said items further include
varying-length items, each one of said varying length items containing a varying number of data elements of a single size and
current number of element items associated with said varying-length items, said current number of elements item associated with each of said varying-length items serving to specify the current number of said data elements in said associated varying-length item; and
certain said name table entries associated with said table names representing said varying-length items, each said certain name table entry including
(a) a current number of elements item specifier specifying said address of said current number of elements item associated with said represented varying-length item and
(b) an element size specifier specifying said single size of said elements in said represented varying-length item, the method of obtaining said current length of said represented varying-length item comprising the steps of:
(1) fetching said current number of elements item specifier into said processor means;
(2) determining said address of said current number of elements item using said current number of elements item specifier;
(3) fetching said current number of elements item into said processor means;
(4) fetching said element size specifier into said processing means;
(5) determining said element size using said element size specifier in said name table entry specified by said name; and
(6) determining said current length using said current number of elements item and said element size.

16. In the method of claim 15, and wherein:
said current number of elements item associated with each one of certain ones of said varying-length items is at an address which is at a predetermined displacement from said address of said one of said certain ones of said varying-length items
said current number of elements item specifier in each said certain name table entry specified by said table name representing said one of said certain ones of said varying-length items is a constant specifying said predetermined displacement of said current number of elements item associated with said represented varying-length item from said represented varying-length item; and
said step (2) includes the steps of
(a) determining said address of said represented one of said certain ones of said varying-length items using said certain name table entry specified by said table name representing said represented one of said certain ones of said varying-length items and (b) adding said constant to said address of said represented one of said certain ones of said varying-length items to obtain said address of said number of elements item.

17. In the method of claim 15, and wherein:
said element size specifier is in the alternative
- an element size item name of said names representing an element size item associated with said varying-length item represented by said table name;
- a first constant value representing said size of said elements, and
- a second constant value representing a number of left shifts; and said step (6) alternatively includes when said element size specifier is said element size item name,
- (a) obtaining said address of said element size item using said element size item name,
- (b) fetching said element size item from said memory means, and
- (c) multiplying said current number of elements item by said element size item, when said element size specifier is said first constant value,
- multiplying said current number of elements item by said first constant value, and when said element size specifier is said second constant value, left-shifting said current number of elements item the number of times specified by said second constant value.

* * * * *